(12) United States Patent
Asveren et al.

(10) Patent No.: US 11,363,075 B2
(45) Date of Patent: *Jun. 14, 2022

(54) METHODS AND APPARATUS FOR EFFICIENT LOAD BALANCING AMONG MICROSERVICES AND/OR PROCESSING ENTITIES

(71) Applicant: Ribbon Communications Operating Company, Inc., Westford, MA (US)

(72) Inventors: Tolga Asveren, Bordentown, NJ (US); Nagesh Kumar Bollapolli, Bangalore (IN); Aby Kuriakose, Howell, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,808

(22) Filed: Jun. 24, 2021

(65) Prior Publication Data
US 2022/0046065 A1 Feb. 10, 2022

Related U.S. Application Data

(63) Continuation of application No. 17/023,521, filed on Sep. 17, 2020, now Pat. No. 11,070,595.

(30) Foreign Application Priority Data

Aug. 4, 2020 (IN) .............................. 202041033306

(51) Int. Cl.
*H04W 28/08* (2009.01)
*H04L 65/10* (2022.01)
(Continued)

(52) U.S. Cl.
CPC .... *H04L 65/1006* (2013.01); *H04L 29/06197* (2013.01); *H04L 29/06319* (2013.01);
(Continued)

(58) Field of Classification Search
CPC ......... H04L 29/06197; H04L 29/06319; H04L 47/125; H04L 65/1006; H04L 65/1016;
(Continued)

(56) References Cited

U.S. PATENT DOCUMENTS

2014/0115129 A1* 4/2014 Chaudhari .......... H04L 61/2564
709/221
2014/0323083 A1* 10/2014 Caldwell ............... H04M 15/88
455/406
(Continued)

*Primary Examiner* — Le H Luu
(74) *Attorney, Agent, or Firm* — Straub & Straub; Stephen T. Straub; Michael P. Straub

(57) ABSTRACT

The present invention is directed to communications methods and apparatus for efficiently distributing traffic to processing entities. An exemplary method includes the steps of: receiving, at a first Session Initiation Protocol (SIP) load balancer (SLB), a first SIP INVITE message; selecting, at the first SLB, which Session Border Controller (SBC) in a first cluster of SBCs to send the first SIP invite message based on a message allocation weight determined based on message loss information corresponding to different SBCs in the first cluster of SBCs, the selecting including allocating a portion of incoming received SIP INVITE messages to an individual SBC based on a message loss rate corresponding to the individual SBC and the message allocation rate, said selecting including selecting a first SBC from the first cluster of SBCs to send said first SIP INVITE message, and sending the first SIP INVITE message to the first SBC.

28 Claims, 21 Drawing Sheets

(51) Int. Cl.
*H04L 47/125* (2022.01)
*H04L 65/1033* (2022.01)
*H04L 65/1069* (2022.01)
*H04L 65/1104* (2022.01)
*H04L 65/1066* (2022.01)
*H04L 65/1016* (2022.01)

(52) U.S. Cl.
CPC .......... *H04L 47/125* (2013.01); *H04L 65/104* (2013.01); *H04L 65/1016* (2013.01); *H04L 65/1036* (2013.01); *H04L 65/1069* (2013.01); *H04W 28/08* (2013.01); *H04W 28/0808* (2020.05)

(58) Field of Classification Search
CPC ............... H04L 65/1036; H04L 65/104; H04L 65/1069; H04L 65/105; H04L 65/1073; H04L 41/0893; H04L 61/2564; H04W 28/08; H04W 28/0808; H04W 8/005; H04M 15/88; H04M 3/22; H04M 3/523; H04M 7/1285
See application file for complete search history.

(56) References Cited

U.S. PATENT DOCUMENTS

| | | | |
|---|---|---|---|
| 2015/0264089 A1* | 9/2015 | Ramanchandran | H04L 41/0893 370/254 |
| 2015/0312838 A1* | 10/2015 | Torres | H04L 65/105 370/329 |
| 2015/0365370 A1* | 12/2015 | Gvildys | H04L 65/1006 709/206 |
| 2016/0036991 A1* | 2/2016 | Brewer | H04M 7/1285 370/356 |
| 2016/0105545 A1* | 4/2016 | Filonov | H04M 3/22 379/1.02 |
| 2016/0352838 A1* | 12/2016 | Larkin | H04L 65/1006 |
| 2018/0007612 A1* | 1/2018 | Jahangir | H04W 8/005 |
| 2018/0077229 A1* | 3/2018 | Bharrat | H04L 65/1006 |
| 2019/0208061 A1* | 7/2019 | Bischoff | H04M 3/523 |
| 2020/0120146 A1* | 4/2020 | Christopher | H04L 65/1073 |

\* cited by examiner

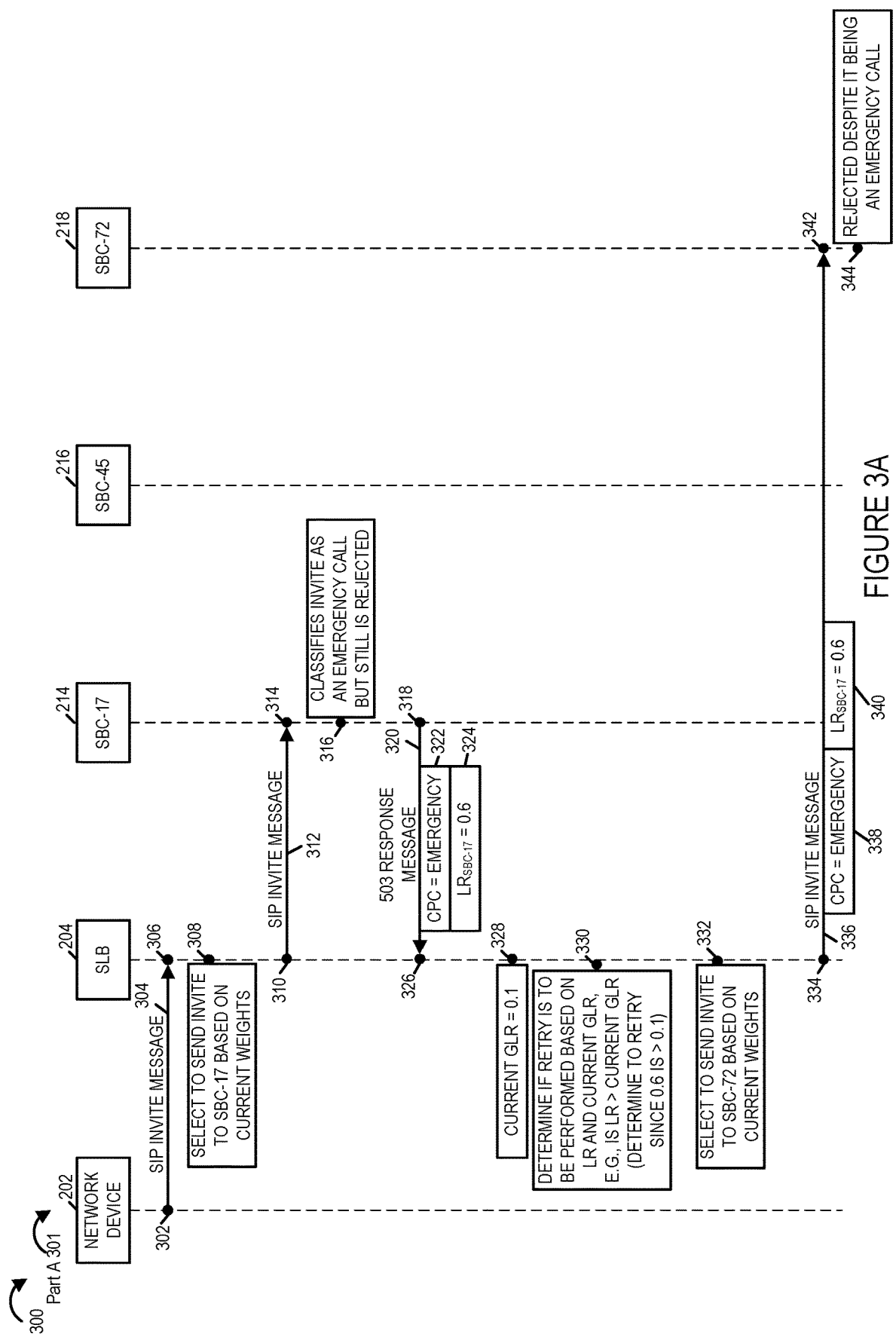

ns of the invention are also applicable to load balancing

METHODS AND APPARATUS FOR EFFICIENT LOAD BALANCING AMONG MICROSERVICES AND/OR PROCESSING ENTITIES

RELATED APPLICATIONS

The present application is a continuation of U.S. patent application Ser. No. 17/023,521 which was filed on Sep. 17, 2020 and which claims the benefit of Indian Provisional Patent Application Serial Number: 202041033306 which was filed on Aug. 4, 2020, both of the aforementioned applications are hereby expressly incorporated by reference in their entirety.

FIELD

The present application relates to communications methods and apparatus, and more particularly, to methods and apparatus for efficiently load balancing or distributing traffic among microservices and/or processing entities, e.g., session border controllers, in a cluster.

BACKGROUND

Most microservices/loosely coupled cluster architectures depend on the notion of a Front-End (FE). FE distributes traffic to Back-End (BE) entities. Sometimes there are more than one FE, with each FE working independent of each other. FEs distribute traffic to BEs. This distribution should be as evenly as possible for best utilization of available resources. FIG. 1 is a drawing 100 of a cluster architecture 102 including Front End (FE) entities (front end 1 106, . . . , front end M 108) and Back-End Entities (back end 1 110, . . . , back end n 112) in which the FEs distribute traffic 104 to the BE entities.

There are certain practical constraints/subtle points pertaining to this procedure, which will now be described. There is a m:n relationship between FE/BE which makes a centralized FE view of BE status impractical. FEs should be as lightweight as possible as they are expected to distribute traffic for a large number of BEs. Traffic classification usually requires protocol specific procedures which are not suitable to be implemented in FEs as that would impact their performance significantly. Traffic for the cluster should be distributed as evenly as possible among BEs. Overall cluster overload status should be considered when rejecting traffic. An overload situation should not be exacerbated; therefore, generating unnecessary retries should be avoided.

Furthermore, incoming traffic may be classified in different categories requiring special semantics. For example, a message classified as high priority may be expected to be completed with a higher probability even if the cluster is overloaded.

Providing a technological solution adhering to the aforementioned restrictions is challenging. Based on the above discussion there is a need for new methods and apparatus to efficiently distribute traffic in a cluster. From the foregoing, it is readily apparent that there is a need for new and/or improved methods and apparatus for an efficient way of distributing traffic that is dynamically scalable and in which the number of devices to which the traffic is distributed can vary greatly along with the processing capacities of each of the devices to which the traffic is distributed.

SUMMARY

The present invention is directed to communications methods and apparatus for efficient load balancing in microservices and/or clusters of processing entities. For example, various exemplary methods and embodiments are directed to efficiently load balancing traffic among a cluster of processing entities, e.g., session border controller devices or instances. The invention will be described in connection with the processing entities being session border controller devices or instances though it is to be understood that the processing entities are not limited to session border controllers but may be other devices and/or instances which process incoming traffic such as for example session initiation protocol processing devices, network nodes, etc. In some embodiments, the processing devices, e.g. session border controllers, are virtual processing devices, e.g., virtual session border controllers which are implemented on compute nodes for example in a cloud environment or system. Various embodiments of the present invention address and solve one or more of the technological problems discussed above.

The SBCs in the cluster may, and sometimes do, have different traffic handling throughput capacities. The number of SBCs in a cluster may change over time, e.g., as the system is scaled up or down. Exemplary load balancing, in accordance with some embodiments of the present invention, does not require the load balancer to know the individual throughput capacities of the SBCs of the cluster being managed. In addition exemplary load balancing, in accordance with some embodiments of the present invention, is well suited for use in scalable systems.

A load balancer distributing traffic to a cluster of SBCs maintains a global loss rate (sometimes referred to as a global loss ratio) for the cluster based on received message loss rates corresponding to the individual SBCs in the cluster. Each SBC in the cluster maintains its own message loss rate, e.g. a ratio of INVITEs rejected to INVITEs received over a predetermined time interval. A message loss rate (loss ratio) for an SBC, e.g., a ratio of rejected INVITEs to received INVITEs over an interval of time, is reported to the load balancer from the SBC as part of a service unavailable response message in response to an INVITE message from the load balancer. The load balancer determines loss weights for each of the SBCs in the cluster and a total weight for the cluster, and then the load balancer determines message allocations weights for each of the SBCs in the cluster, e.g., each message allocation weight specifying a percentage of received INVITEs to be assigned to a particular SBC in the cluster. SBCs in the cluster are selected to receive INVITEs based on determined message allocation weights.

The load balancer determines if an INVITE, which has been rejected by a SBC in the cluster to which it was sent, should be sent to another SBC in the cluster, as a retry attempt, based on SBC message loss rate information, corresponding to one or more SBCs which rejected the INVITE, the current global loss rate (GLR) being maintained by the SLB and/or call type information, e.g., identifying the call as an emergency or non-emergency call, which was classified by an SBC which received the INVITE.

While the invention has been described herein in connection with the load balancing of Session Initation Protocol (SIP) INVITE messages amongst a cluster of Session Border Controllers based on the SIP INVITE rejection rate or loss rate reported by the individual Session Border Controllers of the cluster, it should be understood that such an implementation is only exemplary and that the methods and mechanisms of the invention are also applicable to load balancing of SIP INVITE requests based on SBCs reporting their current resource utilization. In such implementations for example, the current resource utilization may be, and in some embodiments is, an amalgam of occupancy of various resources in a SBC combined/mixed in a way so as to reflect the overall utilization of resources by the SBC. In such embodiments, the load balancing is based on resource utilization values instead of being based on SIP INVITE rejection rate.

While the SIP INVITE rejection rate or loss rate has been described as being sent by the SBC to the SLB as being included in a SIP INVITE response message, e.g., SIP INVITE rejection response, it should be understand that that the SIP INVITE rejection rate or loss rate may be, and in some embodiments is, reported via the information being attached to any message sent by SBC to SLB or as a message explicitly used for this purpose in addition to or instead of sending it in an SIP INVITE rejection response. This is similarly true for the reporting of resource utilization values by SBCs of a cluster to the SLB. An exemplary resource utilization value may be, and in some embodiments is, the ratio of current CPU and/or memory usage versus maximum available CPU and/memory capabilities.

An exemplary communications method, in accordance with some embodiments, comprises: receiving, at a first Session Initiation Protocol (SIP) load balancer (SLB), a first SIP INVITE message; selecting, at the first SLB, which Session Border Controller (SBC) in a first cluster of SBCs to send the first SIP invite message based on a message allocation weight (total weight) determined based on message loss information corresponding to different SBCs in the first cluster of SBCs, said selecting including allocating a portion of incoming received SIP INVITE messages to an individual SBC based on a message loss rate corresponding to the individual SBC and said message allocation rate, said selecting including selecting a first SBC from the first cluster of SBCs to send said first SIP INVITE message; sending the first SIP INVITE message to the first SBC; and receiving a first SIP response message (e.g., 503 response message including a message loss rate for the first SBC or 200 ok response) from the first SBC in response to the first SIP INVITE message.

The invention is also directed to systems and apparatus that are used to implement the various method embodiments of the invention. In some apparatus embodiments the processing entity such as for example a SIP processing device or an SBC and each of the other apparatus/nodes/devices such as the load balancer of the system include a processor and a memory, the memory including instructions which when executed by the processor control the apparatus/node/device of the system to operate to perform the steps of various method embodiments of the invention or functions ascribed to the various apparatus/node/device of the system. In some embodiments, the SBCs and/or processing entities/devices are virtual devices implemented on compute nodes in a cloud system wherein the compute node includes a processor and memory or is attached to a memory.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 3A is a first part of signaling diagram illustrating an exemplary SLB, exemplary SBCs within a cluster of SBCs and an example of an emergency call which is initially rejected, for which multiple retries are performed, in accordance with an exemplary embodiment.

FIG. 3 comprises the combination of FIG. 3A and FIG. 3B.

DETAILED DESCRIPTION

Figure 1:
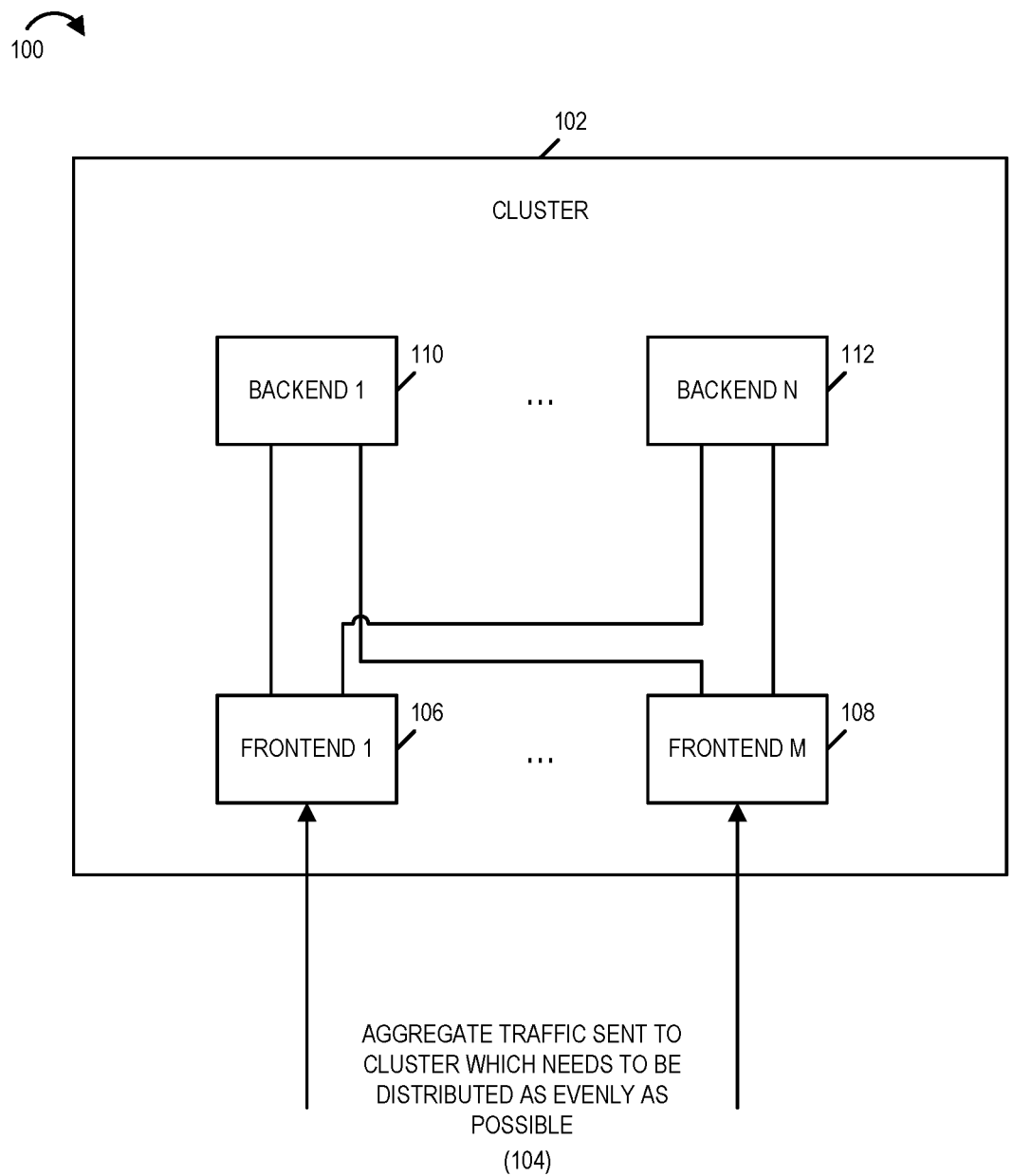
FIG. 1 is a drawing of a cluster architecture including Front End (FE) entities and Back-End Entities in which the FEs distribute traffic to the BE entities.

The following mechanisms are defined to provide the desired functionality without violating the aforementioned practical constraints. As an example, a SBC cluster handling real time sessions is considered. Sessions can be, and sometimes are, in regular/emergency categories. An exemplary FE is, in some embodiments, called a SIP Load Balancer (SLB). An exemplary Back-End (BE), in some embodiments, is a Session Border Controller (SBC). The use of a Session Border Controller as a BE entity is exemplary and it is to be understood that the invention is applicable to other back end entities such as for example other SIP processing devices. A cluster of SBCs is a plurality or group of SBCs that provide a unit view to entities outside the cluster. The invention is applicable to a cluster of virtual SBCs which are implemented on compute nodes in a cloud environment. A compute node including a processor and being attached to or including memory. In some embodiments of the invention, microservices, such as for example session or call establishment services, are provided by a cluster of processing entities/devices.

Call distribution will now be described. Weight is a value kept by SLB to determine how INVITES should be distributed across SBCs. In some embodiments, initially weight is always 100 for all instances. Weight is not tied directly to the actual capacity of an instance. Weight is updated based on "loss ratio" reports from SBCs. Loss ratio is a weighted sliding average of (INVITE rejected/INVITE received), e.g., (Dialog initiated INVITE rejected/Dialog initiated INVITE received), measured in an interval of time, e.g., a couple of seconds. In some embodiments, the interval of time used for the loss ratio determination is a configurable value. Loss ratio is sometimes referred to as loss rate. SBCs send loss rate to SLBs. An SLB uses loss rate for weight adjustments, e.g., weight=100−loss ratio). Initial INVITE requests are distributed based on weight.

A first example will now be described. Initially weight is 100 for each of the SBCs. Consider, for the first example, that there are 100 SBCs. Total weight would be 100*100=10000. Each of the SBCs will get 100/10000 of INVITES=1% which is equal distribution and is expected.

Now consider that 10 of the SBCs report a 70% loss rate. Weight for each of these 10 SBCs is adjusted, by the SLB, to 100−70=30. Total weight, calculated by the SLB, is now 10*30+90*100=9300. Consider that 10 of the SBCs reported a loss rate (LR) of 70%. Each of the 10 SBCs, which reported loss rate of 70%, will get 30/9300, which is approximately 0.32% of the INVITES. Each of the other 90 SBCs will get 100/9300, which is approximately 1.07% of the INVITES. Thus the overloaded 10 SBCs get less than 1% of the INVITES and the other 90 SBCs get more than 1% of the INVITES to compensate for the overloaded SBCs.

A second example will now be described. Initially weight is 100 for each of the SBCs. Consider, for the second example, that there are 100 SBCs. Total weight would be 100*100=10000. Each of the SBCs will get 100/10000 of INVITES=1% which is equal distribution and is expected. Consider that each of the 100 SBCs reported a 50% loss rate (LR) or any other loss rate but the same for each of the SBCs. Weight for each of these 100 SBCs is adjusted, by the SLB, to 100−50=50. Total weight calculated by the SLB is now 100*50=5000. Each of the 100 SBCs will get 50/5000=1% of the INVITES.

Various features and/or aspects related to retrying rejected calls, e.g. rejected INVITES, will now be described. This section describes SLB procedures to follow if a SBC replies with a 503 Retry-After for an initial INVITE. In various embodiments, a SBC adds its loss rate as a parameter to a 503 response message.

For regular calls, two exemplary options are provided. The first option is for the SLB to never retry in response to a failed INVITE corresponding to a regular call, e.g., the SLB never resends the failed INVITE to another SBC in the cluster following initial failure. This first option approach sometimes would trigger a retry by the peer, e.g., if the "Adjusting Retry-After" causes 503 to be dropped. Thus, in some embodiments, if no reply is received the peer will retry after some time-out period of time. In the second option, for regular calls, retries are attempted by the SLB, until the multiplication of each of the loss parameters is determined to be greater than the current global loss ratio.

For emergency calls, the SBC adds cpc=emergency proprietary parameter to Request-URI indicating that the call has been classified as an emergency call. For emergency calls, retries are attempted by the SLB, until the multiplication of each of the loss parameters is determined to be greater than the current global loss ratio.

In various embodiments, a Global Loss Ratio, sometimes referred to as Global Loss Rate, is determined by an SLB based on the loss ratios, sometimes referred to as loss rates, reported by each SBC to the SLB. In one simple example, there are three SBCs, SBC-1, SBC-2 and SBC-3. SBC-1 reports a message loss ratio of 0.7; SBC-2 reports a message loss ratio of 0.3; and SBC-3 reports a message loss ratio of 0.4. SBC-1 weight=100−70=30. SBC-2 weight=100−30=70. SBC-3 weight=100−40=60. Global Loss Ratio (GLR)= ((30*0.7)+(70*0.3)+(60*0.4))/(30+70+60)=(21+21+24)/160=0.4125.

Figure 2:
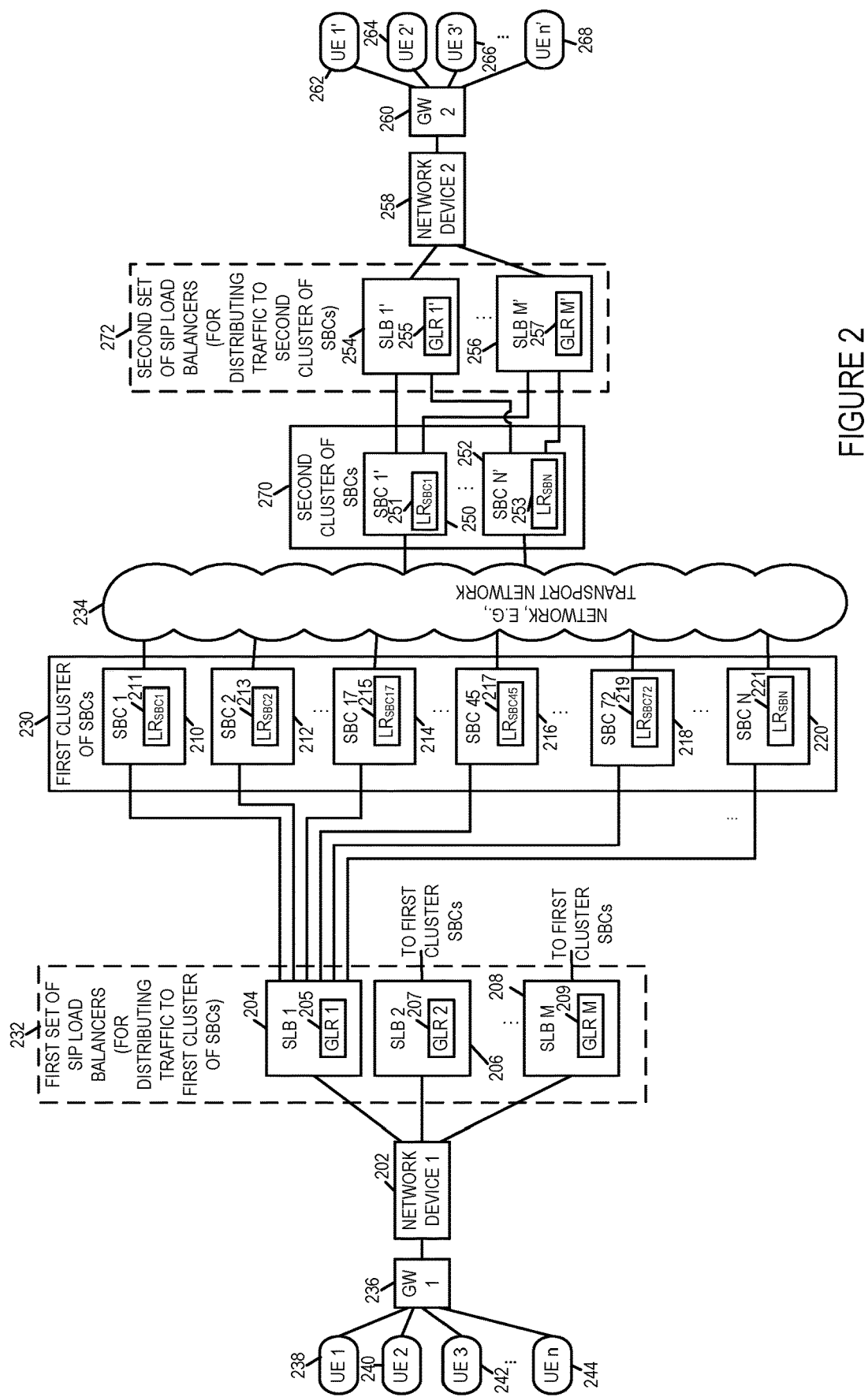
FIG. 2 is a drawing of an exemplary communications system including SIP Load Balancers (SLBs) and Session Border Controllers (SBCs) in accordance with an exemplary embodiment.

FIG. 2 is a drawing of an exemplary communications system 200 including SIP Load Balancers (SLBs) and Session Border Controllers (SBCs) in accordance with an exemplary embodiment. Exemplary communications system 200 includes network device 1 202 coupled a first set 232 of SIP load balances (SLB 1 204, SLB 2 206, . . . , SLB M 208). In one exemplary embodiment M=4. Exemplary communications system 200 further includes a first cluster 230 of SBCs, said first cluster of SBCs including N SBCs (SBC 1 210, SBC 2 212, . . . , SBC 17 214, . . . , SBC 45 217, . . . , SBC 72 218, . . . SBC N 220). In one exemplary embodiment N=100. Each of the SBCs (SBC 1 210, SBC 2 212, . . . , SBC 17 214, . . . , SBC 45 217, . . . , SBC 72 218, . . . SBC N 220) in the first cluster of SBCs maintains its message Loss Rate ($LR_{SBC1}$ 211, $LR_{SBC2}$ 213, . . . , $LR_{SBC17}$ 215, $LR_{SBC45}$ 217, . . . , $LR_{SBC72}$ 219, . . . , $LR_{SBCN}$ 221), respectively. Each of the SIP load balancers (SLB 1 204, SLB 2 206, . . . , SLB M 208) in the set 232 maintains its own global loss rate value (GLR 1 205, GLR 2 207, ..., GLR M 209) for the first cluster 230 of SBCs. For example, GLR 1 205 is maintained and updated by SLB 1 204 based on message loss rate values communicated to SLB 1 204 from SBCs in the first cluster 230 via 503 response messages directed to SLB 1 204 which include a current LR value corresponding to the SBC which sent the message. Similarly, GLR 2 207 is maintained and updated by SLB 2 206 based on message loss rate values communicated to SLB 2 206 from SBCs in the first cluster 230 via 503 response messages directed to SLB 2 206 which include a current LR value corresponding to the SBC which sent the message. In this exemplary embodiment, each SLB (204, 206, ... 208) in the first set 232 of SIP load balancers is coupled to each of the SBCs (210, 212, ..., 214, ..., 216, ..., 218, ..., 220) in the first cluster 230 of SBCs. Communications system 200 further includes network 234, e.g., a transport network. The SBCs of the first cluster 230 of SBCs are coupled to network 234.

The exemplary communications system 200 further includes a first gateway 236 coupled to network device 1 202. GW 1 236 is further coupled to a plurality of user equipments (UEs) (UE 1 238, UE 2 240, UE 3 242, ..., UE n 244). Each of the UEs (238, 240, 242, ..., 244) may, and sometimes does, initiate a call, e.g., for a communications session with another UE. Network device 202 sends SIP INVITES to the SLBs (204, 206, ... 208) for distribution to the SBCs of the first cluster 230. Network device 202 also receives response messages, e.g., a SIP 200 ok message or a service unavailable message, e.g. SIP 503 message, in response to the INVITE. In some embodiments, a service unavailable message may, and sometimes does includes a retry after indicator value indicating a delay time before retrying.

Exemplary communications system 200 further includes a second network device, network device 2 258 coupled to a second set of SIP load balancers (SLB 1' 254, ..., SLB M' 256) coupled to a second cluster 270 of SBCs, said second cluster of SBCs (SBC 1' 250, ..., SBC N' 252). Each of the SBCs (SBC 1' 250, ..., SBC N' 252) in the second cluster of SBCs maintains its message Loss Rate ($LR_{SBC1'}$ 251, ..., $LR_{SBCN'}$ 253), respectively. Each of the SIP load balancers (SLB 1' 254, ..., SLB M' 256) in the set 272 maintains its own global loss rate value (GLR 1' 255, ..., GLR M' 257) for the second cluster 270 of SBCs. In this exemplary embodiment, each SLB (254, ..., 256) in the second set 272 of SIP load balancers is coupled to each of the SBCs (250, ..., 252) in the second cluster 270 of SBCs. The SBCs of the second cluster of SBCs 270 are further coupled to network 234, e.g., a transport network.

The exemplary communications system 200 further includes a second gateway 260 coupled to network device 2 258. GW 2 260 is further coupled to a plurality of user equipments (UEs) (UE 1' 262, UE 2' 264, UE 3' 266, ..., UE n' 268). Each of the UEs (262, 264, 266, ..., 268) may, and sometimes does, initiate a call, e.g., for a communications session with another UE. Network device 2 258 sends SIP INVITES to the SLBs (254, ..., 256) for distribution to the SBCs of the second cluster 270. Network device 2 258 also receives response messages, e.g., a SIP 200 ok message or a service unavailable message, e.g. SIP 503 message, in response to the INVITE. In some embodiments, a service unavailable message may, and sometimes does includes a retry after indicator value indicating a delay time before retrying.

Figure 3B:
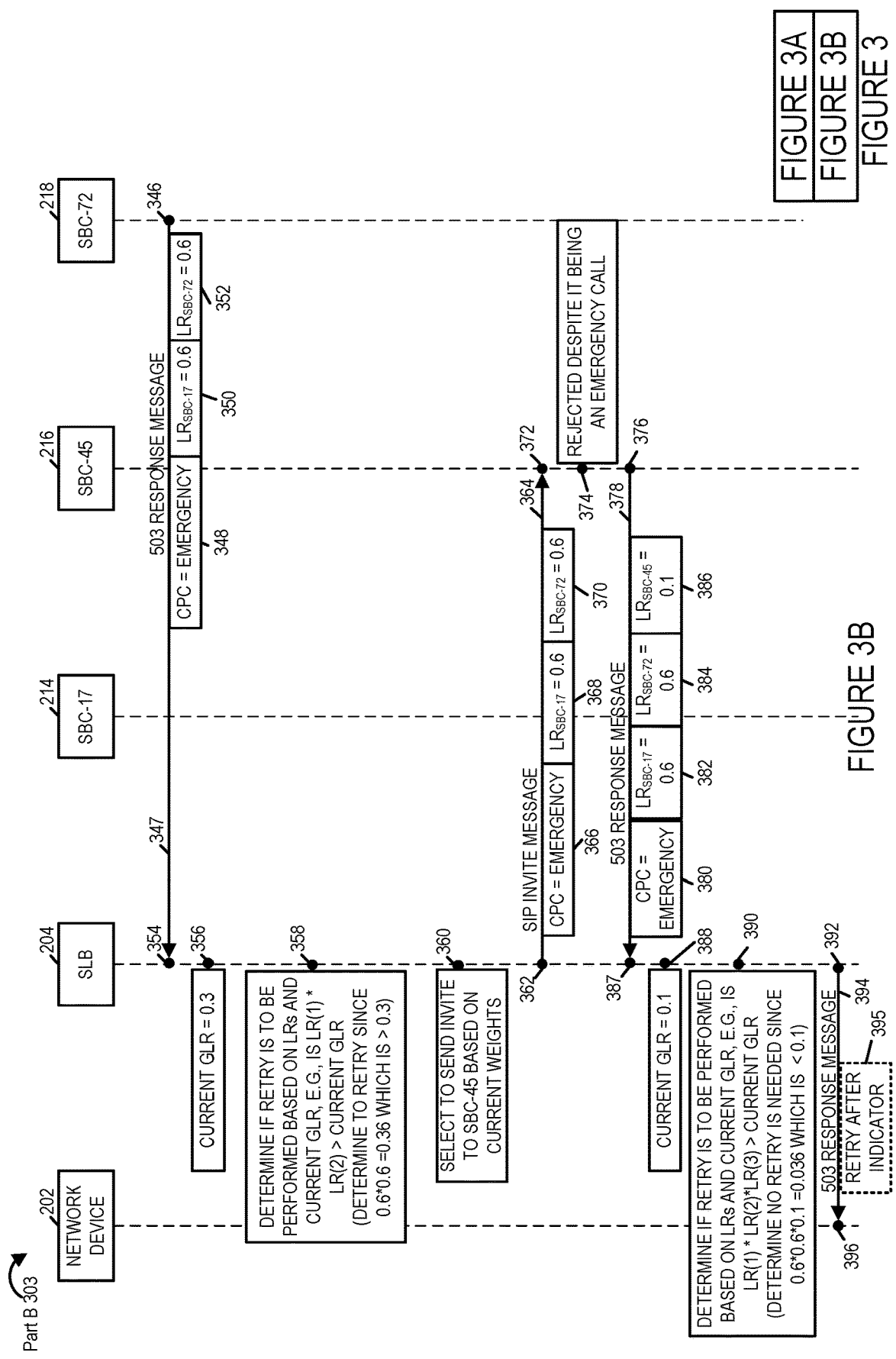
FIG. 3B is a second part of signaling diagram illustrating an exemplary SLB, exemplary SBCs within a cluster of SBCs and an example of an emergency call which is initially rejected, for which multiple retries are performed, in accordance with an exemplary embodiment.

FIG. 3, comprising the combination of FIG. 3A and FIG. 3B is a signaling drawing 300, comprising the combination of Part A 301 and Part B 303, illustrating an exemplary network device 202, an exemplary SLB 204, exemplary SBCs (SBS-17 214, SBC-45 216, SBC 218) within a cluster of SBCs, e.g., a cluster of 100 SBCs, and an example of an emergency call which is initially rejected, in which multiple retries are performed, in accordance with an exemplary embodiment. The devices (202, 204, 214, 216, 218) are, e.g., part of exemplary system 200 of FIG. 2.

In step 302, network device 202 generates and sends SIP INVITE message 304, e.g., including information requesting to establish a call with a peer device, to SLB 204. In step 306, SLB 204 receives SIP INVITE message 304 and recovers the communicated information. In step 308 SLB 204 selects to sent INVITE message 304 to SBC-17 214 based on current weights. In step 310 SLB 204 generates and sends SIP INVITE message 312, which includes information included in SIP INVITE message 304, to SBC-17 214. In step 314, SBC-17 214 receives SIP INVITE message 312 and recovers the communicated information. In step 316 SBC-17 214 classifies the received INVITE as an emergency call but still rejects the call. In step 318, SBC-17 214 generates and sends 503 response message 320, which is a service unavailable response message, to SLB 204. SBC-17 214 has included in the 503 response message 320 the following additional information: i) calling party category=emergency, which is information 322 and ii) loss rate (LR) for SBC-17 (LRSBC-17)=0.6, which is information 324.

In step 326, SLB 204 receives 503 response message 320 and recovers the communicated information. In step 328, SLB 204, which is being operated to maintain a global loss rate (GLR) for SLB 204 updates the GLR value based on the received message loss rate of 0.6 indicating the message loss rate at SBC-17 and obtains a current GLR=0.1. In step 330 SLB 204 determines if a retry is to be performed based on LR and current GLR, e.g., is LR> current GLR. In this example, in step 330 SLB 204 determines to retry since LR=0.6 is greater than the current GLR=0.1. In step 332, SLB 204 selects to send the INVITE to SBC-72 based on current weights.

In step 334, SLB 204 generates and sends SIP INVITE message 336 to SBC-72 218. SIP INVITE message 336 includes information included in SIP INVITE message 304 plus CPC=emergency, which is information 338, and $LR_{SBC-17}$=0.6, which is information 340. In step 342, SBC-72 218 receives SIP INVITE message 336 and recovers the communicated information and identifies the call as an emergency call based on information 338. In step 344 SBC-72 218 rejects the call despite the call be an emergency call. In step 346, SBC-72 218 generates and sends 503 response message 347, which is a service unavailable response message, to SLB 204. SBC-72 218 has included in the 503 response message 347 the following recovered information: i) calling party category=emergency, which is information 348 and ii) loss rate (LR) for SBC-17 (LRSBC-17)=0.6, which is information 350, and additional new information loss rate (LR) for SBC-72 ($LR_{SBC-72}$)=0.6, which is information 352.

In step 354, SLB 204 receives 503 response message 347 and recovers the communicated information. In step 356, SLB 204, which is being operated to maintain a global loss rate (GLR) for SLB 204 updates the GLR value based on the received message loss rate of 0.6 indicating the message loss rate at SBC-72 and obtains a current GLR=0.3. In step 358 SBL 204 determines if a retry is to be performed based on LRs (corresponding to the previous INVITE attempts) and the current GLR, e.g., is LR(1)*LR(2)> current GLR. In this example, in step 358 SLB 204 determines to retry, since LR(1), which is $LR_{SBC-17}$=0.6, *LR(2), which is $LR_{SBC-72}$=0.6, equals 0.36, which is greater than the current GLR=0.3. In step 360, SLB 204 selects to send the INVITE to SBC-45 216 based on current weights.

In step 362, SLB 204 generates and sends SIP INVITE message 364 to SBC-45 216. SIP INVITE message 364 includes information included in SIP INVITE message 304 plus CPC=emergency, which is information 366, $LR_{SBC-17}$=0.6, which is information 368, $LR_{SBC-72}$=0.6, which is information 352. In step 372, SBC-45 216 receives SIP INVITE message 364 and recovers the communicated information and identifies the call as an emergency call based on information 366. In step 374 SBC-45 216 rejects the call despite the call being an emergency call. In step 376, SBC-45 216 generates and sends 503 response message 378, which is a service unavailable response message, to SLB 204. SBC-45 216 has included in the 503 response message 378 the following recovered information: i) calling party category=emergency, which is information 380, ii) loss rate (LR) for SBC-17 (LRSBC-17)=0.6, which is information 382, and iii) loss rate (LR) for SBC-72 (LRSBC-72)=0.6, which is information 384, and additional new information loss rate (LR) for SBC-45 ($LR_{SBC-45}$)=0.1, which is information 386.

In step 387, SLB 204 receives 503 response message 378 and recovers the communicated information. In step 390, SLB 204, which is being operated to maintain a global loss rate (GLR) for SLB 204 updates the GLR value based on the received message loss rate of 0.1 indicating the message loss rate at SBC-45 and obtains a current GLR=0.1. In step 390 SBL 204 determines if a retry is to be performed based on LRs (corresponding to the previous INVITE attempts) and the current GLR, e.g., is LR(1)*LR(2)*LR(3)> current GLR. In this example, in step 390 SLB 204 determines that no retry is needed, since LR(1), which is $LR_{SBC-17}$=0.6, *LR(2), which is $LR_{SBC-72}$=0.6, *LR(3), which is $LR_{SBC-45}$=0.1 equals 0.036, which is less than the current GLR=0.1. In step 390, SLB 204 generates and sends 503 response message 394 to network device 202 in response to SIP INVITE message 304. In step 396 network device 202 receives the 503 response message 394 and recognizes that the call attempt has be rejected.

In some embodiments, the 503 response message 394 may, and sometimes does, include a retry after indicator value 395, e.g. indicating a delay time, e.g. in seconds, before retrying. In some embodiments, SLB 204 determines if the retry after indicator should be included in the response message 394 and the value of the retry after indicator, when included, e.g. based on the type of call, the global loss ratio, predetermined thresholds of the global loss ratio and/or predetermined delay times corresponding to different thresholds.

The following options are provided to adjust: Retry-After (value)/Relay of 503 message to prevent upstream elements blocking traffic toward the cluster immaturely:

i) Drop 503 (for emergency call or for all calls) (Peer will retry after timeout)

ii) If call is a regular call and "never retry" is used for regular calls, reject call if SBC loss ratio is greater than global loss ratio.

iii) Relay 503 with modified Retry after value.

iv) Provided Retry-After values are used, Retry-After values are configurable, e.g., for each option. (This is an enhancement on top of previous options.)

v) Retry-After value=function (global loss ratio)

vi) Retry-After value (as a function of global loss ratio) is used and sent with the 503 message when global loss ratio is above a first predetermined value; otherwise drop 503 message.

If global loss ratio< a first predetermined value (e.g., 0.5) drop the 503 message. (In some embodiments, the Peer will retry after timeout.)

If (global loss ratio≥ the first predetermined value (e.g., 0.5)) and (global loss ratio< a second predetermined value (e.g., 0.6)), set the Retry-After value=randomize[V1, V2], e.g. a randomized selection of value V1 and value V2, and send the 503 message with the determined Retry After value, e.g., V1 or V2. In one example V1=1 second and V2=2 seconds.

If (global loss ratio≥ the second predetermined value (e.g., 0.6)) and (global loss ratio< a third predetermined value (e.g., 0.7)), set the Retry-After value=randomize[V2,V3], e.g. a randomized selection of value V2 and value V3, and send the 503 message with the determined Retry After value, e.g., V2 or V3. In one example V2=2 seconds and V3=3 seconds.

If (global loss ratio≥ the third predetermined value (e.g., 0.7)) and (global loss ratio< a fourth predetermined value (e.g., 0.8)), set the Retry-After value=randomize[V3,V4] e.g. a randomized selection of value V2 and value V3, and send the 503 message with the determined Retry After value, e.g., V3 or V4. In one example V3=3 second and V4=4 seconds.

If (global loss ratio≥ the fourth predetermined value (e.g., 0.8), set the Retry-After value=randomize[V4, V5], e.g. a randomized selection of value V4 and value V5 and send the 503 message with the determined Retry After value, e.g., V4 or V5. In one example V4=4 seconds and V5=6 seconds.

Figure 4A:
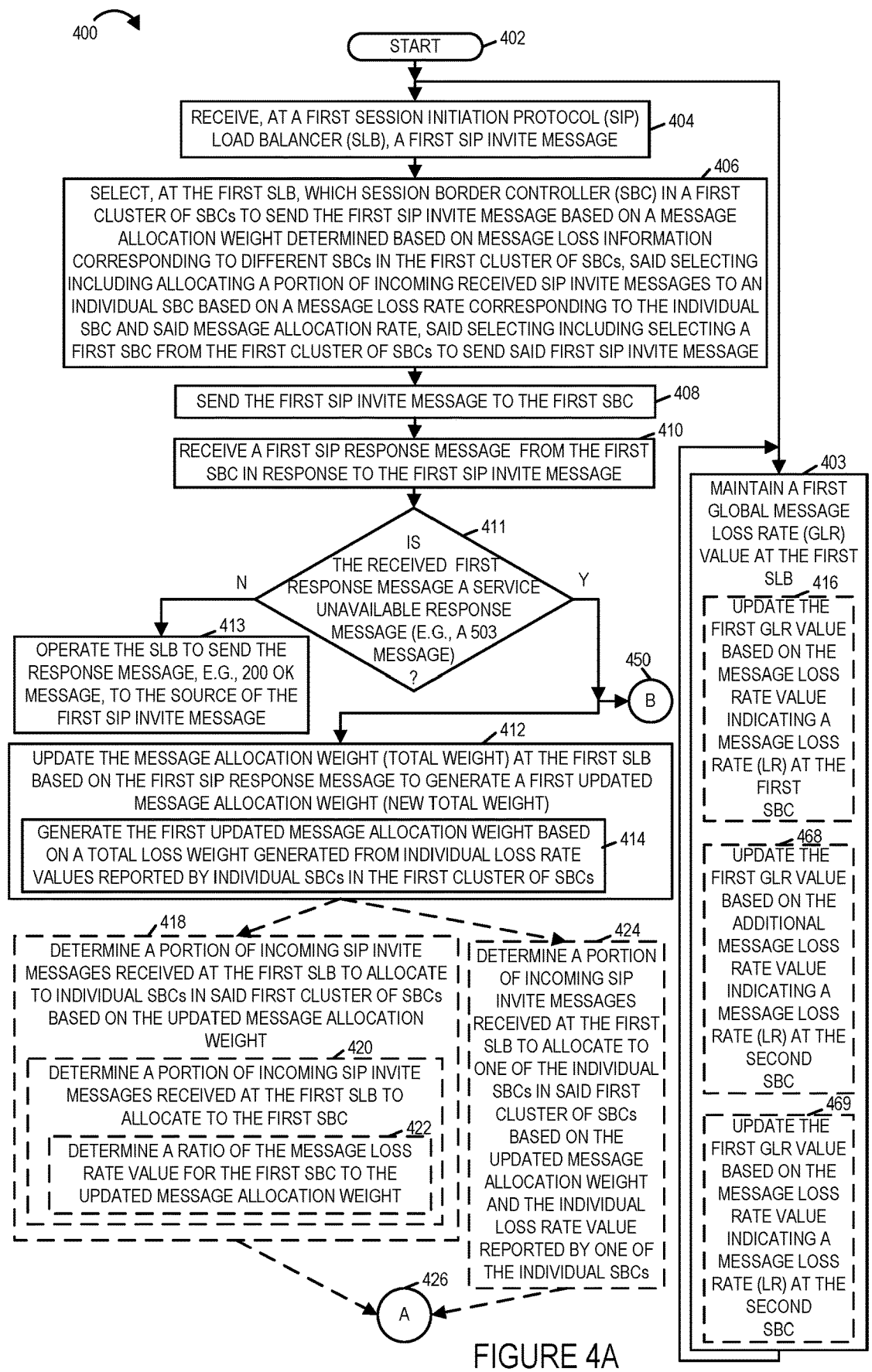
FIG. 4A is a first part of a flowchart of an exemplary communications method, e.g., a method of distributing traffic among SBCs in a cluster, in accordance with an exemplary embodiment.
Figure 4B:
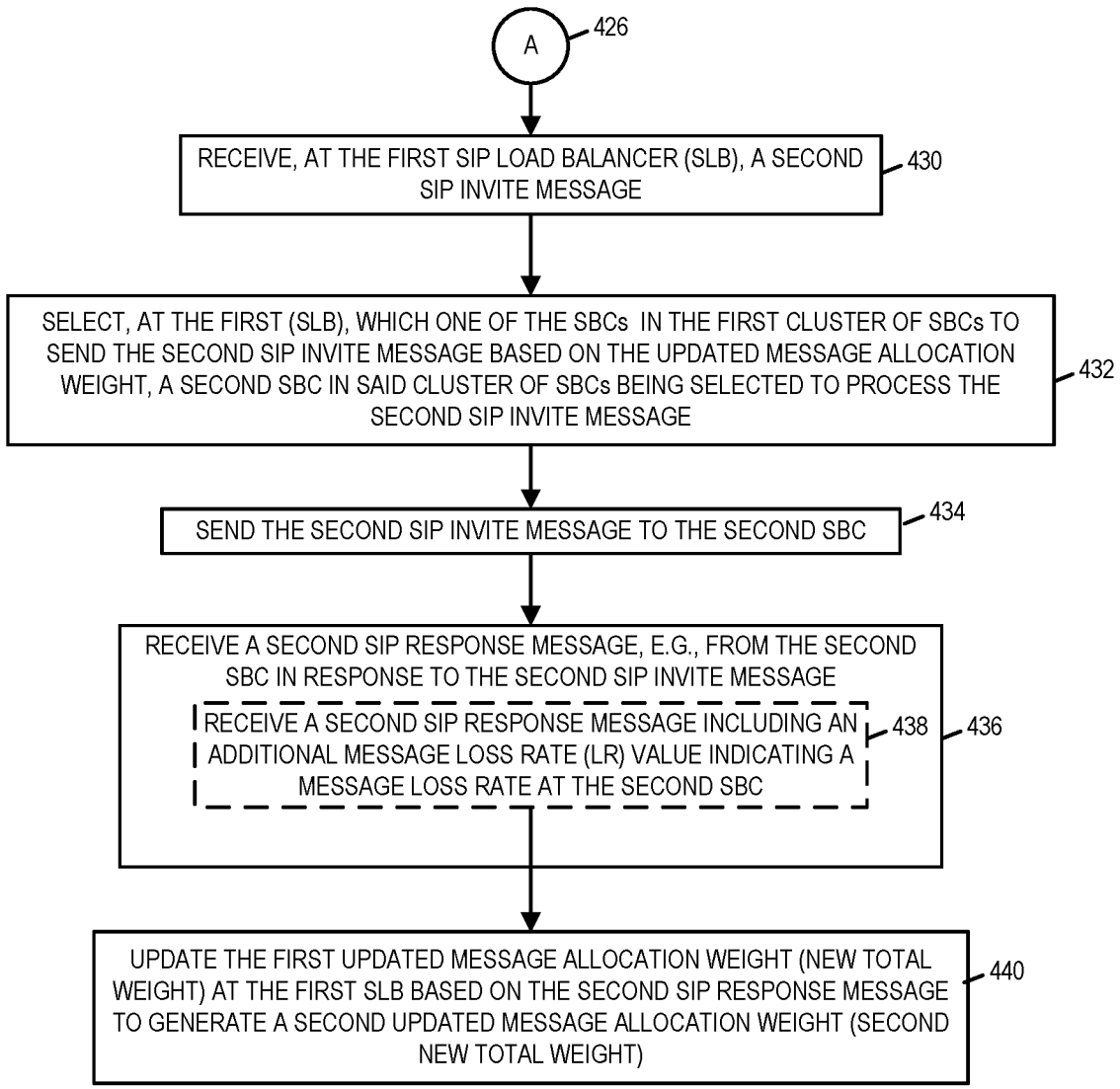
FIG. 4B is a second part of a flowchart of an exemplary communications method, e.g., a method of distributing traffic among SBCs in a cluster, in accordance with an exemplary embodiment.
Figure 4C:
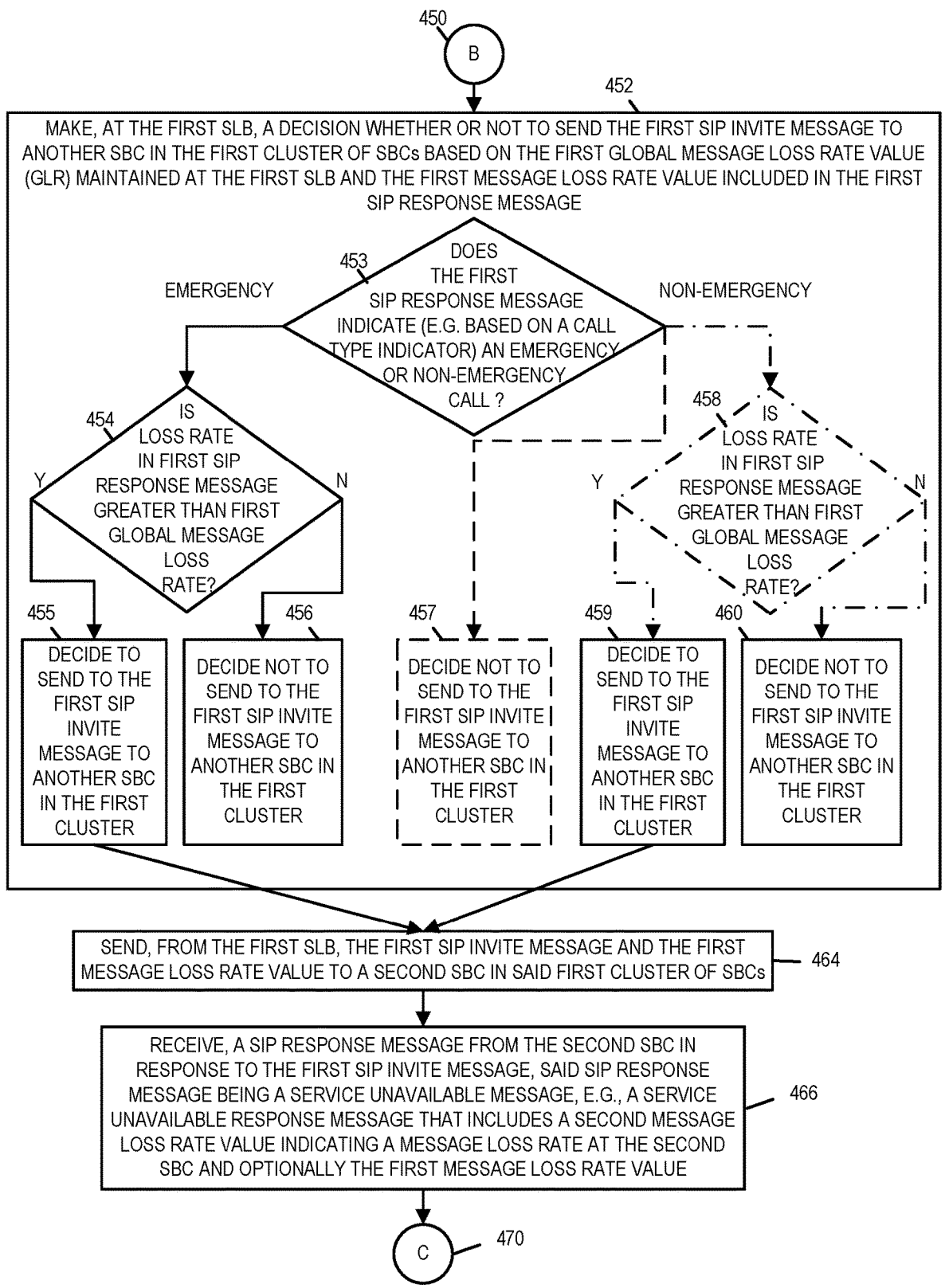
FIG. 4C is a third part of a flowchart of an exemplary communications method, e.g. a method of distributing traffic among SBCs in a cluster, in accordance with an exemplary embodiment.
Figure 4D:
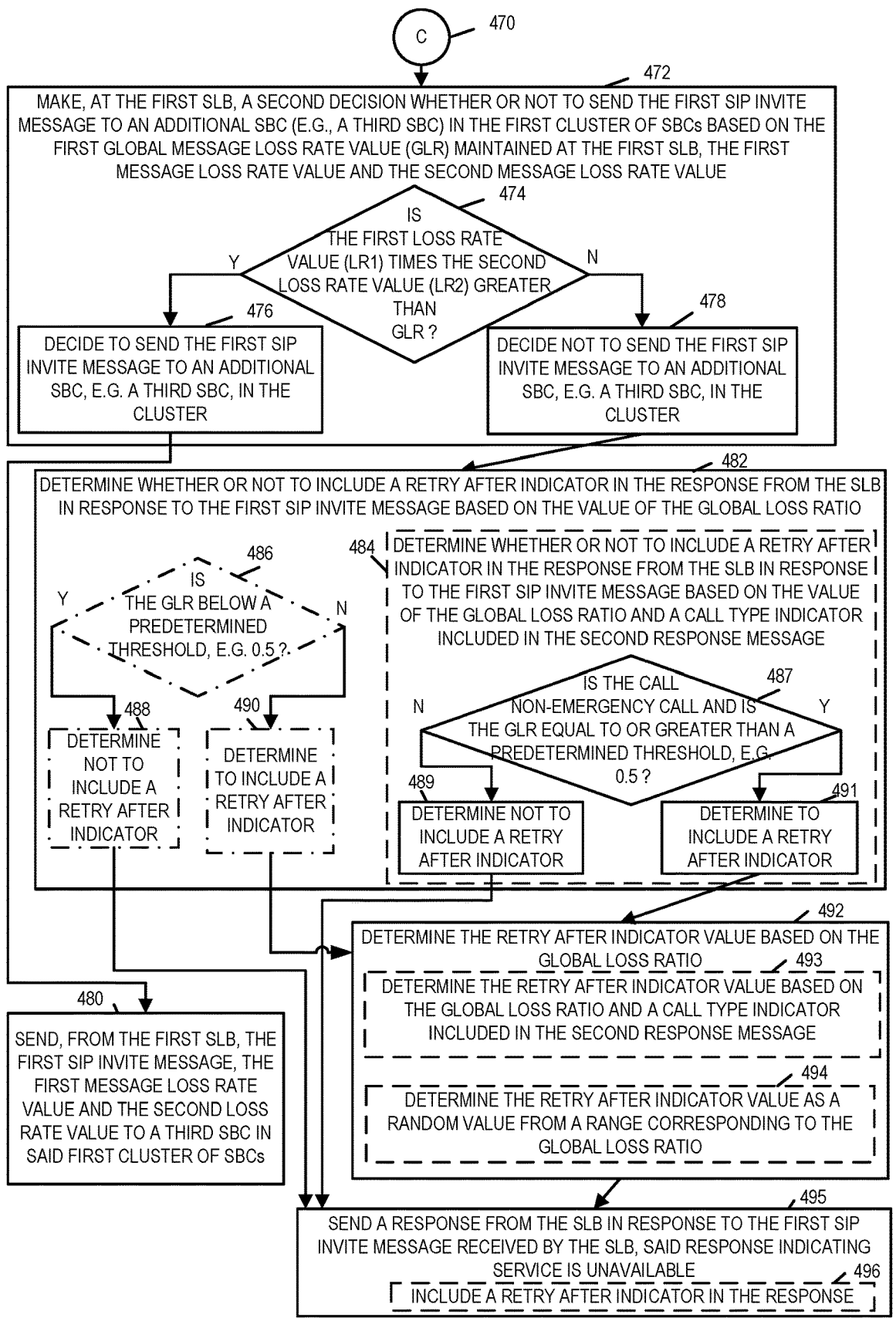
FIG. 4D is a fourth part of a flowchart of an exemplary communications method, e.g., a method of distributing traffic among SBCs in a cluster, in accordance with an exemplary embodiment.
Figure 4:
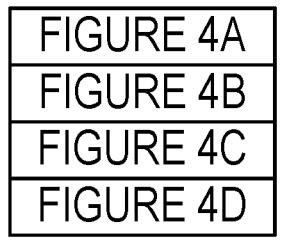
FIG. 4 comprises the combination of FIG. 4A, FIG. 4B, FIG. 4C and FIG. 4D.

FIG. 4, comprising the combination of FIG. 4A, FIG. 4B, FIG. 4C and FIG. 4D, is a flowchart 400 of an exemplary communications method, e.g., a method of distributing traffic among SBCs in a cluster of SBCs in an exemplary communications system, in accordance with an exemplary embodiment. The exemplary communications system includes one or more SLBs and a plurality of SBCs. The exemplary communications system is, e.g., communications system 200 of FIG. 2.

Operation of the exemplary method starts in step 402 in which the communications system is powered on and initialized. In some embodiments, as part of the initialization the initial weight is set to 100 for each of the SBCs. In some embodiments, as part of the initialization the global message loss rate for each of the SIP load balancers is set at 0. In some embodiments, as part of the initialization the total weight being maintained by a SLB is a function of the number of SBCs in the cluster which the SLB is managing, e.g., for a cluster or 100 SBCs, the initial total weight is set to 10000.

Operation proceds from step 402 to step 403 and step 404. In step 403 a first global message loss rate (GLR) value is maintained at a first session initiation protocol (SIP) load balancer (SLB), e.g., SLB 1 204. Step 403 is performed on an ongoing basis, e.g. with the GLR value, e.g., GLR 1 205, being updated in response to received a message from an SBC communicating a message loss rate (LR) at the SBC.

In step 404, the first SIP load balancer receives a first SIP INVITE message, e.g. from a network device, e.g., network device 1 202. Operation proceeds from step 404 to step 406.

In step 406 the first SLB selects which session border controller (SBC) in a first cluster of SBCs, e.g., cluster 230, to send the first SIP INVITE message based on a message allocation weight (total weight) determined based on message loss information corresponding to different SBCs in the first cluster of SBCs, said selecting including allocating a portion of incoming received SIP INVITE messages to an individual SBC based on a message loss rate corresponding to the individual SBC and said message allocation rate, said selecting including selecting a first SBC, e.g., SBC-17 214, from the first cluster of SBCs to send said first SIP INVITE message. Operation proceeds from step 406 to step 408.

In step 408 the first SIP load balancer sends the first SIP INVITE message to the first SBC. Operation proceeds from step 408 to step 410. In step 410, the first SIP load balancer receives a first SIP response message, e.g., a 503 response message or a 200 ok response message, from the first SBC in response to the first SIP INVITE message. In some embodiments, the first SIP response message indicates acceptance or rejection of the first SIP INVITE message, e.g. by the type of response which is received, e.g. 200 ok response message indicating acceptance or 503 response message indicating rejection.

In some embodiments, the first SIP response message is SIP 503 response message indicating rejection of the first SIP INVITE message, and said SIP 503 response message includes a call type indicator. In some such embodiments, the call type indicator indicates an emergency call, said call type having been determined by the first SBC. In some such embodiments, the call type indicator is included in a proprietary parameter of the first SIP response message. In some such embodiments, the proprietary parameter is included in the first SIP response message Request-URI header.

In some embodiments, the first SLB makes a determination as to whether or not to try sending the first SIP INVITE message to another of the SBCs of the first cluster of SBCs based on the call type indicator. In some such embodiments, the call type indicator indicates an emergency call or a non-emergency call, said call type having been determined by the first SBC.

In some embodiments, the call type indicator is only included for emergency calls. Thus, in some embodiments, if a 503 response message in response to the first SIP INVITE message from the first SBC does not include the call type indicator, the SLB infers by the absence of the call type indicator that the call is a non-emergency call. Operation proceeds from step 410 to step 411.

In step 411 the first SLB determines if the received response message is a service unavailable response message, e.g. a 503 message. If the received first response message is not a service unavailable response message, then operation proceeds from step 411 to step 413, in which the first SLB sends the response message, e.g. a 200 OK message, to the source of the first SIP INVITE message, which was received in step 404, e.g., to the network node which is supplying INVITE messages to the first SLB. However, if the first response message is a service unavailable message, e.g., a SIP 503 response message including a first loss rate (LR) value said first LR value corresponding to the first SBC, then operation proceeds from step 411 to step 412 and via connecting node B 450 to step 452.

In step 412 the first SLB updates the message allocation weight (total weight) at the first SLB based on the first SIP response message (sum individual loss rates for SBCs) to generate a first updated message allocation weight (new total weight). Step 412 includes step 414 in which the first SLB generates the first updated message allocation weight based on total loss weight generated from individual loss rate values reported by individual SBCs in the first cluster. (Consider previous example 1, where total weight is the sum of individual loss rate values expressed in short hand form as (10*30+90*100=930.) Operation proceeds from step 412 to step 418 or 424, e.g. depending upon the particular embodiment.

In step 418 the first SLB determines a portion of incoming SIP INVITE messages to allocate to individual SBCs in said first cluster of SBCs based on the updated message allocation weight. Step 418 includes step 420 in which the first SLB determines a portion of incoming SIP INVITE messages received at the first SLB to allocate to the first SBC. Step 420 includes step 422 in which the first SLB determines a ratio of the message loss rate value for the first SBC to updated message allocation weight (Consider previous example 1: if the first SBC is in the 10 SBCs with the higher loss rate the first SBC will be allocated 30/9300 of the incoming INVITE messages to process).

In step 424 the first SLB determines a portion of incoming SIP INVITE messages received at the first SLB to allocate to one of the individual SBCs in said first cluster of SBCs based on the updated message allocation weight and the individual loss rate value reported by one of the individual SBCs. Operation proceeds from step 418 or step 424, via connecting node A 426, to step 430.

In step 430 the first SLB receives a second SIP INVITE message, e.g., from the network device. Operation proceeds from step 430 to step 432. In step 432 the first SLB selects which one of the SBCs in the first cluster to send the second SIP INVITE message based on the updated message allocation weight (total weight), a second SBC, (e.g., SBC-72 218) in said cluster of SBCs being selected to process the second SIP INVITE message. Operation proceeds from step 432 to step 434. In step 434, the first SLB sends the second SIP INVITE message to the second SBC. Operation proceeds from step 434 to step 436. In step 436 the first SLB receives a second SIP response message, e.g., from the second SBC, in response to the second SIP INVITE message. Step 436 may, and sometimes does include step 438 in which the first SLB receives a second SIP response message including an additional loss rate (LR) value indicating a message loss rate at the second SBC. In response to the received second SIP response message including the second loss rate corresponding to the second SBC, in step 468 the first SLB updates the first GLR value based on the additional message loss rate value indicating a message loss rate at the second SBC.

Operation proceeds from step 438 to step 440, in which the first SLB updates the first updated message allocation weight (new total weight) at the first SLB based on the second SIP response message (sum individual loss rates for SBCs) to generate a second updated message allocation weight (second new total weight).

Returning to step 452, in step 452, the first SLB makes a decision whether or not to send the first SIP INVITE message to another SBC in the first cluster of SBCs based on the first global message loss rate value (GLR) maintained at the first SLB and the first message loss rate value included in the first SIP response message (e.g., resend the first SIP INVITE to another SBC in the first cluster of SBCs when the loss rate (LR) in the first SIP response message is greater than the GLR). Step 452, in some embodiments, includes one or more of steps 453, 454, 455, 456, 457, 458, 459 and 460.

In step 453 the first SLB determines if the first SIP response messages indicates, e.g. based on a call type indicator, an emergency call or a non-emergency call. In some embodiments, a call type indicator is included in the first SIP response message, and the call type indicator indicates an emergency call or a non-emergency call. In some other embodiments, a call type indicator is included in the first SIP response message when the call is an emergency call, while the call type indicator is omitted from the first SIP response message when the call is a non-emergency call, e.g., with the omission of the call type indicator implicitly indicating that the call is a non-emergency call.

If the determination of step 453 is that the call is an emergency call, then operation proceeds from step 453 to step 454; however, if the determination of step 453 is that the call is a non-emergency call, then operation proceeds from step 453 to step 457 or to step 458 depending upon the particular embodiment.

Returning to step 454, in step 454, the first SLB determines if the loss rate in the first SIP response message is greater than the first global message loss rate. If the determination of step 454 is that the loss rate in the first SIP response message is greater than the first global message loss rate, then operation proceeds from step 454 to step 455, in which the first SLB decides to send the first SIP INVITE message to another SBC in the first cluster. However, if the determination of step 454 is that the loss rate in the first SIP response message is not greater than the first global message loss rate, then operation proceeds from step 454 to step 456, in which the first SLB decides not to send the first SIP INVITE message to another SBC in the first cluster.

Returning to step 457, in step 457, the first SLB decides not to send the first SIP INVITE message to another SBC in the first cluster.

Returning to step 458, in step 458, the first SLB determines if the loss rate in the first SIP response message is greater than the first global message loss rate. If the determination of step 458 is that the loss rate in the first SIP response message is greater than the first global message loss rate, then operation proceeds from step 458 to step 459, in which the first SLB decides to send the first SIP INVITE message to another SBC in the first cluster. However, if the determination of step 458 is that the loss rate in the first SIP response message is not greater than the first global message loss rate, then operation proceeds from step 458 to step 460, in which the first SLB decides not to send the first SIP INVITE message to another SBC in the first cluster.

Operation proceeds from step 455 or step 459 to step 464. In step 464 the first SLB sends the first SIP INVITE message and the first message loss rate value to a second SBC in said first cluster of SBCs. Operation proceeds from step 464 to step 466. In step 466 the first SLB receives a SIP response message, e.g. a SIP 503 service unavailable response message, from the second SBC in response to the first SIP INVITE message, said SIP response message being a service unavailable message, e.g., a service unavailable message that includes a second message loss rate value indicating a message loss rate at the second SBC and optionally includes the first loss rate value indicating a message loss rate at the first SBC. Operation proceeds from step 466, via connecting node C 470, to step 472.

In step 472, the first SLB makes a second decision whether or not to send the first SIP INVITE message to additional SBC, e.g., a third SBC, in the first cluster of SBCs based on the first global message loss rate value (GLR) maintained at the first SLB, the first message loss rate value and the second message loss rate value (e.g., resent the first INVITE to a third SBC in the cluster when the first loss rate value (LR1) times the second loss rate value (LR2) is less than the GLR).

Step 472, in some embodiments, includes steps 474, 476 and 478. In step 474 the first SLB determines if the first loss rate value (LR1) times the second loss rate value (LR2) is greater than the first global loss rate (GLR). If the SLB determines, in step 474, that the first loss rate times the second loss rate is greater than the first global message loss rate, then operation proceeds from step 474 to step 476, in which the first SLB decides to sent the first SIP INVITE message to an additional SBC, e.g., a third SBC (e.g., SBC-45 216), in the first cluster of SBCs. However, if the SLB determines, in step 454, that the first loss rate value (LR1) times the second loss rate value (LR2) is not greater than the first global message loss rate (GLR), then operation proceeds from step 474 to step 478, in which the first SLB decides not to send the first SIP INVITE message to an additional SBC in the cluster of SBCs.

Operation proceeds from step 476 to step 480, in which the first SLB sends the first SIP INVITE message, the first loss rate value and the second loss rate value to a third SBC in said first cluster of SBCs.

Returning to step 478, operation proceeds from step 478 to step 482. In step 482, the first SLB determines whether or not to include a retry after indicator in the response from the first SLB in response to the first SIP INVITE message based on the value of the global loss ratio.

In some embodiments, step 482 includes step 484, in which the first SLB determines whether or not to include a retry after indicator in the response from the first SLB in response to the first SIP INVITE message based on the value of the global loss ratio and a call type indicator included in the second response message.

In some embodiments, step 482 includes steps 486, 488 and 490. In step 486 the first SLB determines if the GLR is below a predetermined threshold, e.g., 0.5. If the first SLB determines that the GLR is below the predetermined threshold, then operation proceeds from step 486 to step 488, in which the first SLB determines not to include a retry after indicator in the response. However, if the first SLB determines that the GLR is not below the predetermined threshold, then operation proceeds from step 486 to step 490, in which the first SLB determines to include a retry after indicator in the response. Operation proceeds from step 488 to step 495 or operation proceeds from step 490 to step 492.

In some embodiments, step 484 includes steps 487, 489 and 491. In step 487 the first SLB determines if both: i) the call is a non-emergency call and ii) the GLR is equal to or above a predetermined threshold, e.g., 0.5. If the first SLB determines that the call is a non-emergency call and that the GLR is equal to or above the predetermined threshold, then operation proceeds from step 487 to step 491, in which the first SLB determines to include a retry after indicator in the response. However, if the first SLB determines that either of: i) the call is an emergency call or ii) the GLR is below the predetermined threshold, then operation proceeds from step 487 to step 489, in which the first SLB determines not to include a retry after indicator in the response. Operation proceeds from step 489 to step 495 or operation proceeds from step 491 to step 492.

In step 492 the first SLB determines the retry after indicator value, e.g. number of seconds to wait before sending of SIP messages to the first cluster, based on the global loss ratio. For example, a larger retry indicator value is supplied when the global loss ratio is above a second global loss ratio threshold, e.g., 0.7, than when the global loss ratio is below the second threshold and above the first threshold used to trigger inclusion of a retry after indicator.

In some embodiments, step 492 includes step 493 and/or step 494. In step 493 the first SLB determines the retry after indicator value based on the global loss ratio and a call type indicator included in the second response message. For example, given the same GLR, a smaller retry after indicator value is determined corresponding to a failed emergency call than corresponding to a failed non-emergency call. In step 494 the first SLB determines the retry after indicator value as a random value from a range corresponding to the global loss ratio.

Operation proceeds from step 492 to step 495. In step 495 the first SLB sends a response from the SLB in response to the first SIP INVITE message received by the SLB, said response indicating that service is unavailable e.g., the SLB sends a SIP 503 response message to the network device. Step 495 may, and sometimes does, include step 496, in which the first SLB includes a retry after indicator communicating a retry after indicator value, e.g. determined in step 492, in the response.

Figure 9A:
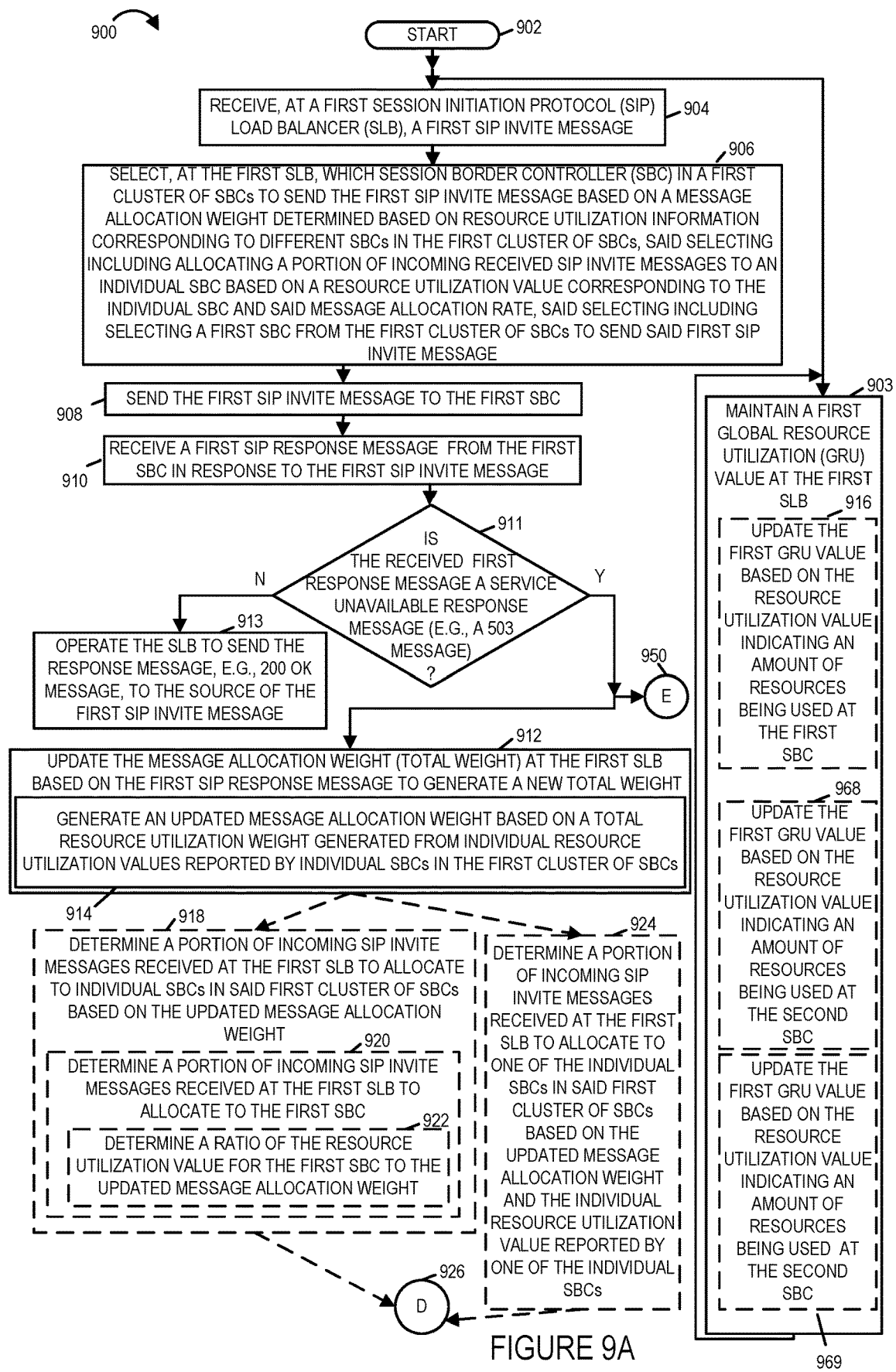
FIG. 9A is a first part of a flowchart of an exemplary communications method, e.g., a method of distributing traffic among SBCs in a cluster, in accordance with an exemplary embodiment.
Figure 9B:
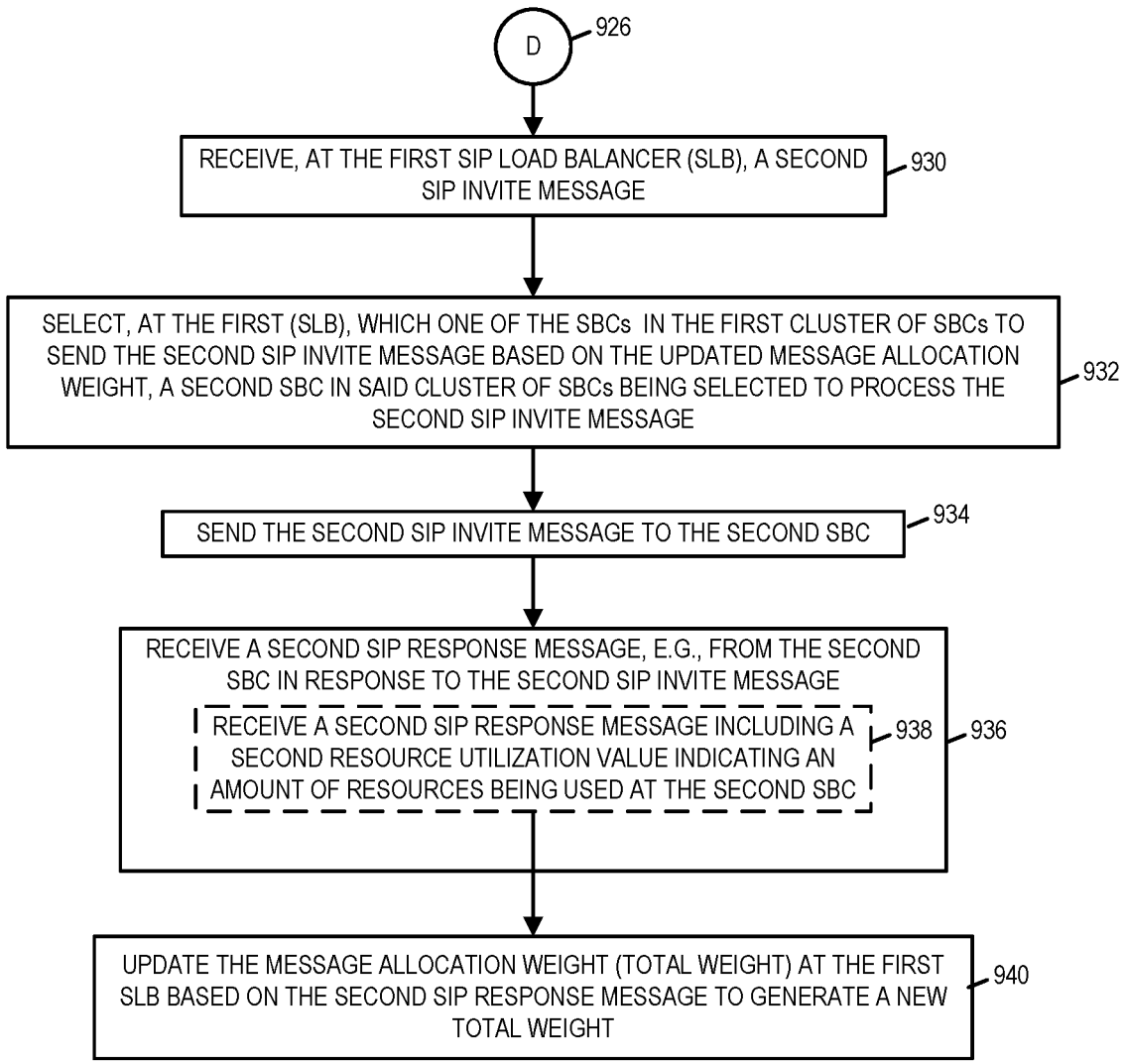
FIG. 9B is a second part of a flowchart of an exemplary communications method, e.g., a method of distributing traffic among SBCs in a cluster, in accordance with an exemplary embodiment.
Figure 9C:
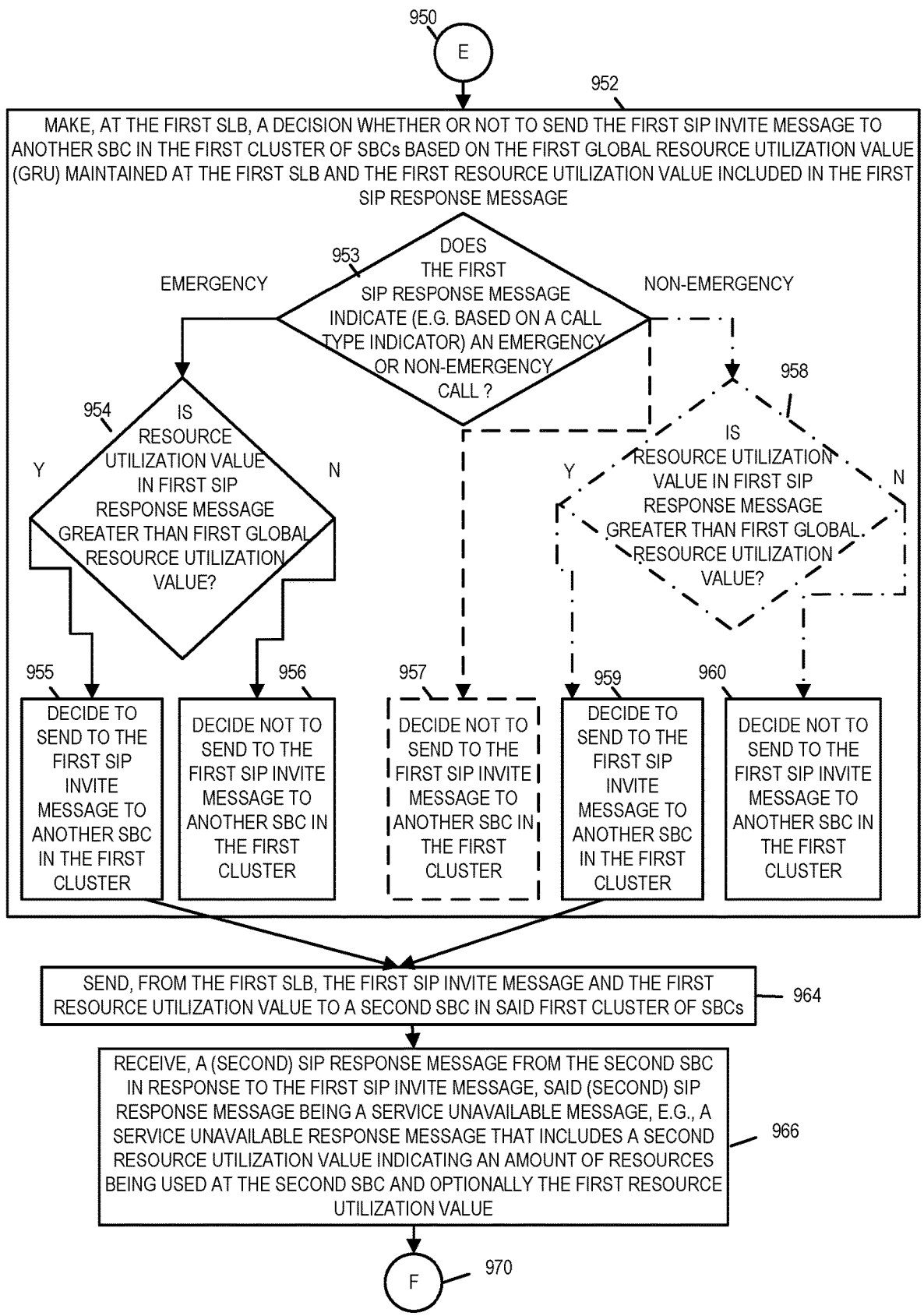
FIG. 9C is a third part of a flowchart of an exemplary communications method, e.g. a method of distributing traffic among SBCs in a cluster, in accordance with an exemplary embodiment.
Figure 9D:
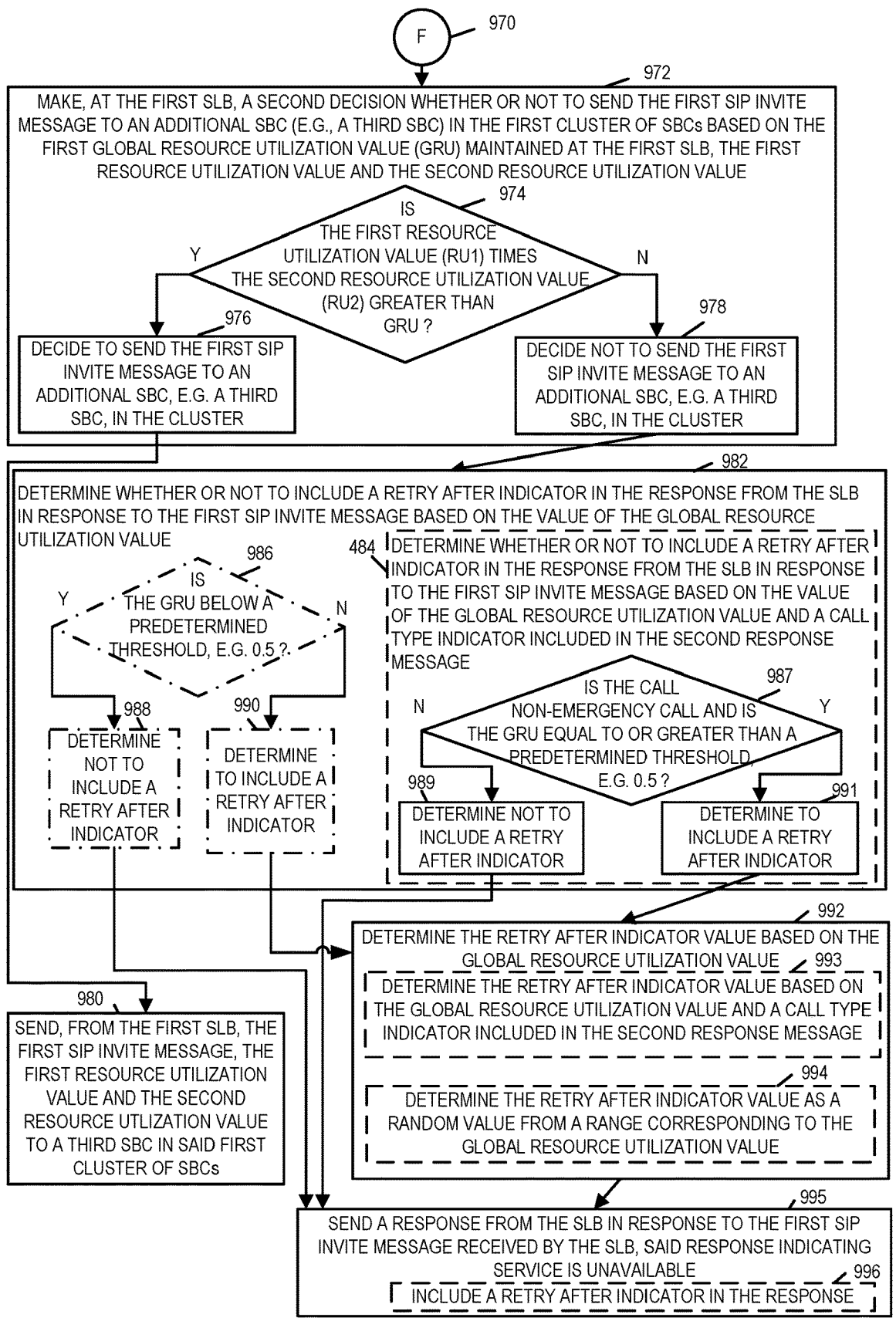
FIG. 9D is a fourth part of a flowchart of an exemplary communications method, e.g., a method of distributing traffic among SBCs in a cluster, in accordance with an exemplary embodiment.
Figure 9:
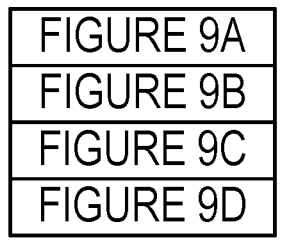
FIG. 9 comprises the combination of FIG. 9A, FIG. 9B, FIG. 9C and FIG. 9D.

FIG. 9, comprising the combination of FIG. 9A, FIG. 9B, FIG. 9C and FIG. 9D, is a flowchart 900 of another exemplary communications method, e.g., a method of distributing traffic among SBCs in a cluster of SBCs in an exemplary communications system, in accordance with an exemplary embodiment. In this embodiment, the load balancing is based on resource utilization values instead of being based on SIP INVITE rejection rate. In the exemplary method 900, the current resource utilization is an amalgam of occupancy of various resources in a SBC combined/mixed in a way so as to reflect the overall utilization of resources by the SBC.

The exemplary communications system includes one or more SLBs and a plurality of SBCs. The exemplary communications system is, e.g., communications system 200 of FIG. 2. However, in this example, the message loss rate and/or ratio (LR) has been replaced with a resource utilization (RU) value which is a value indicating an amount of resources currently being used or occupied vs. the amount of total resources available, e.g., the ratio of the total resources currently being used vs. total resources available at an SBC. Resource utilization value or ratio=amount of resources currently being used at SBC/total amount of resources available at SBC. The resource utilization value in such cases is a number from 0 to 1.0 where 0 represents all resources at the SBC are available (0% usage) and 1.0 represents all resources at the SBC are currently being used or are occupied (100% usage/occupied). The global loss rate or ratio (GLR) in the example has been replaced by a global resource utilization (GRU) value which is the amount of resources currently being used or occupied vs. the total amount of resources available and may also be expressed as a ratio, i.e., (amount of resources currently in use for all SBCs in cluster vs. total resources available for all SBCs in the cluster). The global resource utilization value may also be expressed as a number from 0 to 1.0. 0 indicating no resources are being used (0% usage) and 1.0 indicating all resources are being utilized (100% usage). In some embodiments, the SBC resources are CPU (processing resources), memory resources, and/or a combination of CPU and memory resources at the SBC.

Operation of the exemplary method 900 starts in step 902 in which the communications system is powered on and initialized. In some embodiments, as part of the initialization the initial weight is set to 100 for each of the SBCs. In some embodiments, as part of the initialization the global resource utilization value for each of the SIP load balancers is set at 0. In some embodiments, as part of the initialization the total weight being maintained by a SLB is a function of the number of SBCs in the cluster which the SLB is managing, e.g., for a cluster or 100 SBCs, the initial total weight is set to 10000.

Operation proceeds from step 902 to step 903 and step 904. In step 903 a first global utilization resource value (GRU) value is maintained at a first session initiation protocol (SIP) load balancer (SLB), e.g., SLB 1 204. Step 403 is performed on an ongoing basis, e.g. with the GRU value, e.g., GRU 1 205, being updated in response to received a message from an SBC communicating a resource utilization value (RU) at the SBC.

In step 904, the first SIP load balancer receives a first SIP INVITE message, e.g. from a network device, e.g., network device 1 202. Operation proceeds from step 904 to step 906.

In step 906 the first SLB selects which session border controller (SBC) in a first cluster of SBCs, e.g., cluster 230, to send the first SIP INVITE message based on a message allocation weight (total weight) determined based on resource utilization information corresponding to different SBCs in the first cluster of SBCs, said selecting including allocating a portion of incoming received SIP INVITE messages to an individual SBC based on a resource utilization value corresponding to the individual SBC and said message allocation rate, said selecting including selecting a first SBC, e.g., SBC-17 214, from the first cluster of SBCs to send said first SIP INVITE message. Operation proceeds from step 906 to step 908.

In step 908 the first SIP load balancer sends the first SIP INVITE message to the first SBC. Operation proceeds from step 908 to step 910. In step 910, the first SIP load balancer receives a first SIP response message, e.g., a 503 response message or a 200 ok response message, from the first SBC in response to the first SIP INVITE message. In some embodiments, the first SIP response message indicates acceptance or rejection of the first SIP INVITE message, e.g. by the type of response which is received, e.g. 200 ok response message indicating acceptance or 503 response message indicating rejection.

In some embodiments, the first SIP response message is SIP 503 response message indicating rejection of the first SIP INVITE message, and said SIP 503 response message includes a call type indicator. In some such embodiments, the call type indicator indicates an emergency call, said call type having been determined by the first SBC. In some such embodiments, the call type indicator is included in a proprietary parameter of the first SIP response message. In some such embodiments, the proprietary parameter is included in the first SIP response message Request-URI header.

In some embodiments, the first SLB makes a determination as to whether or not to try sending the first SIP INVITE message to another of the SBCs of the first cluster of SBCs based on the call type indicator. In some such embodiments, the call type indicator indicates an emergency call or a non-emergency call, said call type having been determined by the first SBC.

In some embodiments, the call type indicator is only included for emergency calls. Thus, in some embodiments, if a 503 response message in response to the first SIP INVITE message from the first SBC does not include the call type indicator, the SLB infers by the absence of the call type indicator that the call is a non-emergency call. Operation proceeds from step 910 to step 911.

In step 911 the first SLB determines if the received response message is a service unavailable response message, e.g. a 503 message. If the received first response message is not a service unavailable response message, then operation proceeds from step 911 to step 913, in which the first SLB sends the response message, e.g. a 200 OK message, to the source of the first SIP INVITE message, which was received in step 904, e.g., to the network node which is supplying INVITE messages to the first SLB. However, if the first response message is a service unavailable message, e.g., a SIP 503 response message including a first resource utilization (RU) value said first RU value corresponding to the first SBC, then operation proceeds from step 911 to step 912 and via connecting node E 950 to step 952.

In step 912 the first SLB updates the message allocation weight (total weight) at the first SLB based on the first SIP response message (sum individual resource utilization values for SBCs) to generate a new total. Step 912 includes step 914 in which the first SLB generates an updated message allocation weight based on a total resource utilization weight generated from individual resource utilization values reported by individual SBCs in the first cluster. (Consider previous example 1, where total weight is the sum of individual resource utilization values expressed in short hand form as (10*30+90*100=930.) Operation proceeds from step 912 to step 918 or 924, e.g. depending upon the particular embodiment.

In step 918 the first SLB determines a portion of incoming SIP INVITE messages to allocate to individual SBCs in said first cluster of SBCs based on the updated message allocation weight. Step 918 includes step 920 in which the first SLB determines a portion of incoming SIP INVITE messages received at the first SLB to allocate to the first SBC. Step 920 includes step 922 in which the first SLB determines a ratio of the resource utilization value for the first SBC to updated message allocation weight (Consider previous example 1: if the first SBC is in the 10 SBCs with the higher resource utilization value the first SBC will be allocated 30/9300 of the incoming INVITE messages to process).

In step 924 the first SLB determines a portion of incoming SIP INVITE messages received at the first SLB to allocate to one of the individual SBCs in said first cluster of SBCs based on the updated message allocation weight and the individual resource utilization value reported by one of the individual SBCs. Operation proceeds from step 918 or step 924, via connecting node D 926, to step 930.

In step 930 the first SLB receives a second SIP INVITE message, e.g., from the network device. Operation proceeds from step 930 to step 932. In step 932 the first SLB selects which one of the SBCs in the first cluster to send the second SIP INVITE message based on the updated message allocation weight (total weight), a second SBC, (e.g., SBC-72 218) in said cluster of SBCs being selected to process the second SIP INVITE message. Operation proceeds from step 932 to step 934. In step 934, the first SLB sends the second SIP INVITE message to the second SBC. Operation proceeds from step 934 to step 936. In step 936 the first SLB receives a second SIP response message, e.g., from the second SBC, in response to the second SIP INVITE message. Step 936 may, and sometimes does include step 938 in which the first SLB receives a second SIP response message including a second resource utilization (RU) value indicating an amount of resources being used at the second SBC. In response to the received second SIP response message including the second resource utilization value corresponding to the second SBC, in step 968 the first SLB updates the first GRU value based on the resource utilization value indicating an amount of resources being used at the second SBC.

Operation proceeds from step 938 to step 940, in which the first SLB updates the message allocation weight (total weight) at the first SLB based on the second SIP response message (sum individual resource utilization values for SBCs) to generate a new total weight.

Returning to step 952, in step 952, the first SLB makes a decision whether or not to send the first SIP INVITE message to another SBC in the first cluster of SBCs based on the first global resource utilization value (GRU) maintained at the first SLB and the first resource utilization value included in the first SIP response message (e.g., resend the first SIP INVITE to another SBC in the first cluster of SBCs when the resource utilization (RU) value in the first SIP response message is greater than the GRU). Step 952, in some embodiments, includes one or more of steps 953, 954, 955, 956, 957, 958, 959 and 960.

In step 953 the first SLB determines if the first SIP response messages indicates, e.g. based on a call type indicator, an emergency call or a non-emergency call. In some embodiments, a call type indicator is included in the first SIP response message, and the call type indicator indicates an emergency call or a non-emergency call. In some other embodiments, a call type indicator is included in the first SIP response message when the call is an emergency call, while the call type indicator is omitted from the first SIP response message when the call is a non-emergency call, e.g., with the omission of the call type indicator implicitly indicating that the call is a non-emergency call.

If the determination of step 953 is that the call is an emergency call, then operation proceeds from step 953 to step 954; however, if the determination of step 953 is that the call is a non-emergency call, then operation proceeds from step 953 to step 957 or to step 958 depending upon the particular embodiment.

Returning to step 954, in step 954, the first SLB determines if the resource utilization value in the first SIP response message is greater than the first global resource utilization value. If the determination of step 954 is that the resource utilization value in the first SIP response message is greater than the first global resource utilization value, then operation proceeds from step 954 to step 955, in which the first SLB decides to send the first SIP INVITE message to another SBC in the first cluster. However, if the determination of step 454 is that the resource utilization value in the first SIP response message is not greater than the first global resource utilization value, then operation proceeds from step 954 to step 956, in which the first SLB decides not to send the first SIP INVITE message to another SBC in the first cluster.

Returning to step 957, in step 957, the first SLB decides not to send the first SIP INVITE message to another SBC in the first cluster.

Returning to step 958, in step 958, the first SLB determines if the resource utilization value in the first SIP response message is greater than the first global resource utilization value. If the determination of step 958 is that the resource utilization value in the first SIP response message is greater than the first global resource utilization value, then operation proceeds from step 958 to step 959, in which the first SLB decides to send the first SIP INVITE message to another SBC in the first cluster. However, if the determination of step 958 is that the resource utilization value in the first SIP response message is not greater than the first global resource utilization value, then operation proceeds from step 958 to step 960, in which the first SLB decides not to send the first SIP INVITE message to another SBC in the first cluster.

Operation proceeds from step 955 or step 959 to step 964. In step 964 the first SLB sends the first SIP INVITE message and the first resource utilization value to a second SBC in said first cluster of SBCs. Operation proceeds from step 964 to step 966. In step 966 the first SLB receives a (second) SIP response message, e.g. a SIP 503 service unavailable response message, from the second SBC in response to the first SIP INVITE message, said (second) SIP response message being a service unavailable message, e.g., a service unavailable message that includes a second resource utilization value indicating an amount of resources being used at the second SBC and optionally includes the first resource utilization value indicating an amount of resources being used at the first SBC. Operation proceeds from step 966, via connecting node F 970, to step 972.

In step 972, the first SLB makes a second decision whether or not to send the first SIP INVITE message to additional SBC, e.g., a third SBC, in the first cluster of SBCs based on the first global resource utilization value (GRU) maintained at the first SLB, the first resource utilization value and the second resource utilization value (e.g., resent the first INVITE to a third SBC in the cluster when the first resource utilization value (RU1) times the second resource utilization value (RU2) is less than the GRU).

Step 972, in some embodiments, includes steps 974, 976 and 978. In step 974 the first SLB determines if the first resource utilization value (RU1) times the second resource utilization value (RU2) is greater than the first global resource utilization value (GRU). If the SLB determines, in step 974, that the first resource utilization value times the second resource utilization value is greater than the first global resource utilization value, then operation proceeds from step 974 to step 976, in which the first SLB decides to sent the first SIP INVITE message to an additional SBC, e.g., a third SBC (e.g., SBC-45 216), in the first cluster of SBCs. However, if the SLB determines, in step 454, that the first resource utilization value (RU1) times the second resource utilization value (RU2) is not greater than the first global resource utilization value (GRU), then operation proceeds from step 974 to step 978, in which the first SLB decides not to send the first SIP INVITE message to an additional SBC in the cluster of SBCs.

Operation proceeds from step 976 to step 980, in which the first SLB sends the first SIP INVITE message, the first resource utilization value and the second resource utilization value to a third SBC in said first cluster of SBCs.

Returning to step 978, operation proceeds from step 978 to step 982. In step 982, the first SLB determines whether or not to include a retry after indicator in the response from the first SLB in response to the first SIP INVITE message based on the value of the global resource utilization value.

In some embodiments, step 982 includes step 984, in which the first SLB determines whether or not to include a retry after indicator in the response from the first SLB in response to the first SIP INVITE message based on the value of the global resource utilization value and a call type indicator included in the second response message.

In some embodiments, step 982 includes steps 986, 988 and 990. In step 486 the first SLB determines if the GRU is below a predetermined threshold, e.g., 0.5. If the first SLB determines that the GRU is below the predetermined threshold, then operation proceeds from step 986 to step 988, in which the first SLB determines not to include a retry after indicator in the response. However, if the first SLB determines that the GRU is not below the predetermined threshold, then operation proceeds from step 986 to step 990, in which the first SLB determines to include a retry after indicator in the response. Operation proceeds from step 988 to step 995 or operation proceeds from step 990 to step 992.

In some embodiments, step 984 includes steps 987, 989 and 991. In step 987 the first SLB determines if both: i) the call is a non-emergency call and ii) the GRU is equal to or above a predetermined threshold, e.g., 0.5. If the first SLB determines that the call is a non-emergency call and that the GRU is equal to or above the predetermined threshold, then operation proceeds from step 987 to step 991, in which the first SLB determines to include a retry after indicator in the response. However, if the first SLB determines that either of: i) the call is an emergency call or ii) the GRU is below the predetermined threshold, then operation proceeds from step 987 to step 989, in which the first SLB determines not to include a retry after indicator in the response. Operation proceeds from step 989 to step 995 or operation proceeds from step 991 to step 992.

In step 992 the first SLB determines the retry after indicator value, e.g. number of seconds to wait before sending of SIP messages to the first cluster, based on the global resource utilization value. For example, a larger retry indicator value is supplied when the global resource utilization value is above a second global resource utilization value threshold, e.g., 0.7, than when the global resource utilization value is below the second threshold and above the first threshold used to trigger inclusion of a retry threshold.

In some embodiments, step 992 includes step 993 and/or step 994. In step 993 the first SLB determines the retry after indicator value based on the global resource utilization value and a call type indicator included in the second response message. For example, given the same GRU, a smaller retry after indicator value is determined corresponding to a failed emergency call than corresponding to a failed non-emergency call. In step 994 the first SLB determines the retry after indicator value as a random value from a range corresponding to the global resource utilization value.

Operation proceeds from step 992 to step 995. In step 995 the first SLB sends a response from the SLB in response to the first SIP INVITE message received by the SLB, said response indicating that service is unavailable e.g., the SLB sends a SIP 503 response message to the network device. Step 995 may, and sometimes does, include step 996, in which the first SLB includes a retry after indicator communicating a retry after indicator value, e.g. determined in step 992, in the response.

While in the exemplary method 400, the message loss rate information is communicated from the SBCs to the SLB in SIP INVITE response messages, however the message loss rate may be communicated from the SBC to the SLB in or attached to other SIP messages sent from the SBC to the SLB. Furthermore, a dedicated message, e.g., SIP messages, including the message loss rate information may be, and in some embodiments is communicated from the SBC to the SLB. Any combination of the aforementioned methods of communicating the message loss rate from an SBC to the SLB may be utilized. Similarly, while in the exemplary method 900, the resource utilization value or ratio information is communicated in SIP INVITE response messages to the SLB, the resource utilization value or ration may be communicated from the SBC to the SLB in a variety of different ways the same as discussed in connection with the message loss rate. For example, by being attached to or included in other SIP messages or in dedicated messages sent from the SBC to the SLB.

Figure 5:
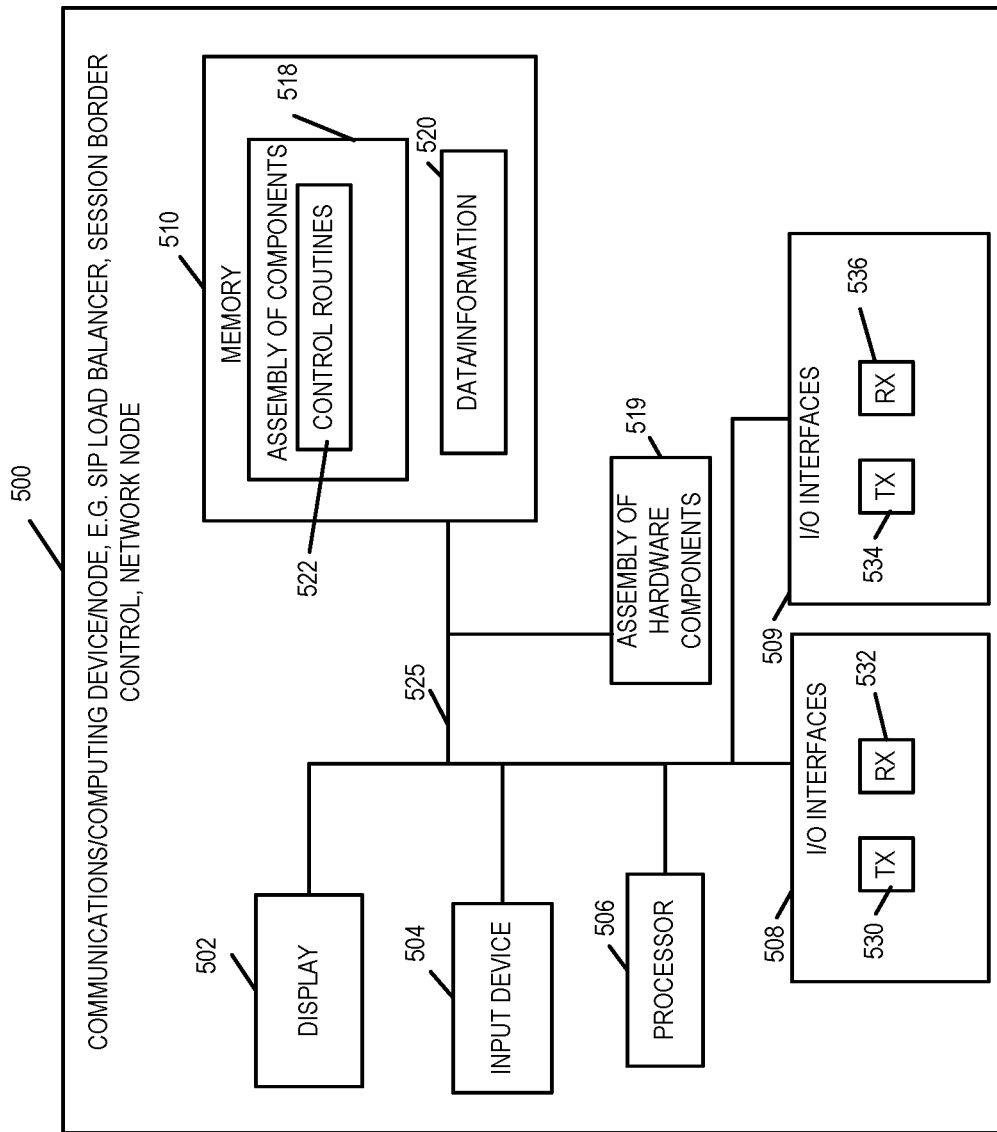
FIG. 5 is a drawing of an exemplary communications device/node, e.g., a SIP load balancer (SLB), a session border controller, a network node, etc., in accordance with an exemplary embodiment.

In some embodiments, one or more of the elements, nodes or components of the above mentioned systems are implemented in accordance with the exemplary computing device/node 500 illustrated in FIG. 5.

Exemplary communications and/or computing device/node 500 includes an optional display 502, an input device 504, a processor 506, e.g., a CPU, I/O interfaces 508 and 509, which couple the communications device/node 500 to networks or communications links and/or various other nodes/devices, memory 510, and an assembly of hardware components 519, e.g., circuits corresponding to different components and/or modules, coupled together via a bus 525 over which the various elements may interchange data and information. Memory 510 includes an assembly of components 518, e.g., an assembly of software components, and data/information 520. The assembly of software components 518 includes a control routines component 522 which includes software instructions which when processed and executed by processor 506 control the operation of the communications/computing device/node 500 to perform various functions and/or one or more steps of the various method embodiments of the invention. The I/O interface 508 includes transmitters 530 and receivers 532. The I/O interface 509 includes transmitters 534 and receivers 536. The I/O interfaces are hardware interfaces including hardware circuitry. The communications and/or computing device/node 500 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Internet Protocol (IP), Transport Control Protocol (TCP), User Datagram Protocol (UDP), WebRTC protocols, Representative State Transfer (REST) protocol, SQL (Structured Query Language) Protocol, and HDFS (Hadoop Distributed File System) Protocol, SQL and/or HDFS being used to interface and access information from the various databases and/or storage devices to which it may be coupled. In some embodiments, the communications and/or computing device/node 500 includes a communication component configured to operate using IP, TCP, UDP, REST, SQL (Structured Query Language), or HDFS (Hadoop Distributed File System). In some embodiments, the communications component is a hardware component, a software component or a component including hardware and software components. While only a single hardware processor is illustrated in some embodiments, it is to be understood that the computing device/node 600 can include more than one processor with the processing being distributed among the plurality of processors. In some embodiments, one or more of the following are implemented in accordance with the communications and/or computing device/node 500 illustrated in FIG. 5: SLBs (204, 206, 208, 254, 256), SBCs (210, 212, 214, 216, 218, 220, 250, 253), network devices (202, 256), GWs (236, 260), and UEs (238, 240, 242, 244, 262, 264, 266, 268).

Figure 6A:
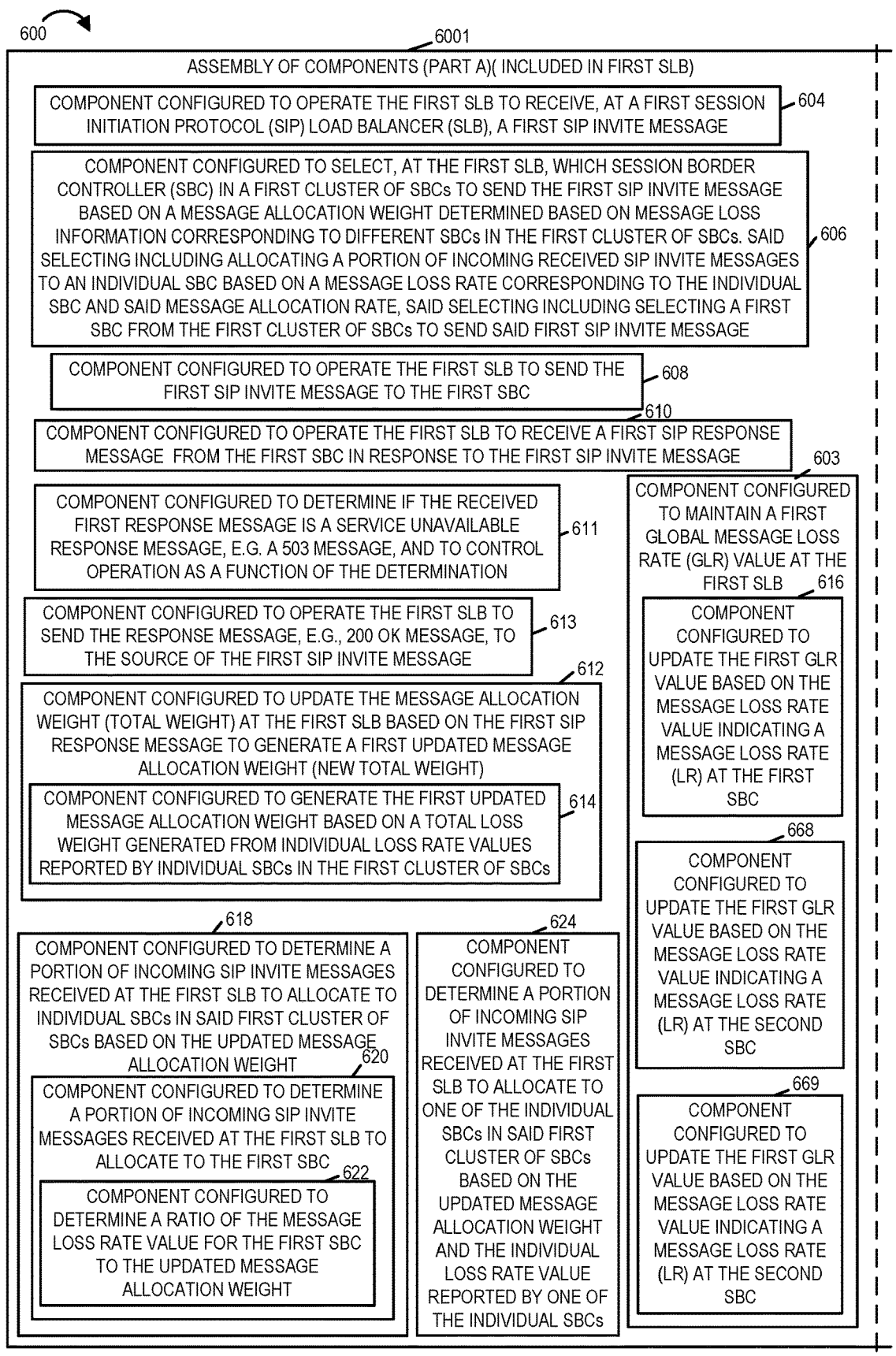
FIG. 6A is a first part of a drawing of an exemplary assembly of components which may be included in an exemplary SIP load balancer (SLB) in accordance with an exemplary embodiment.
Figure 6B:
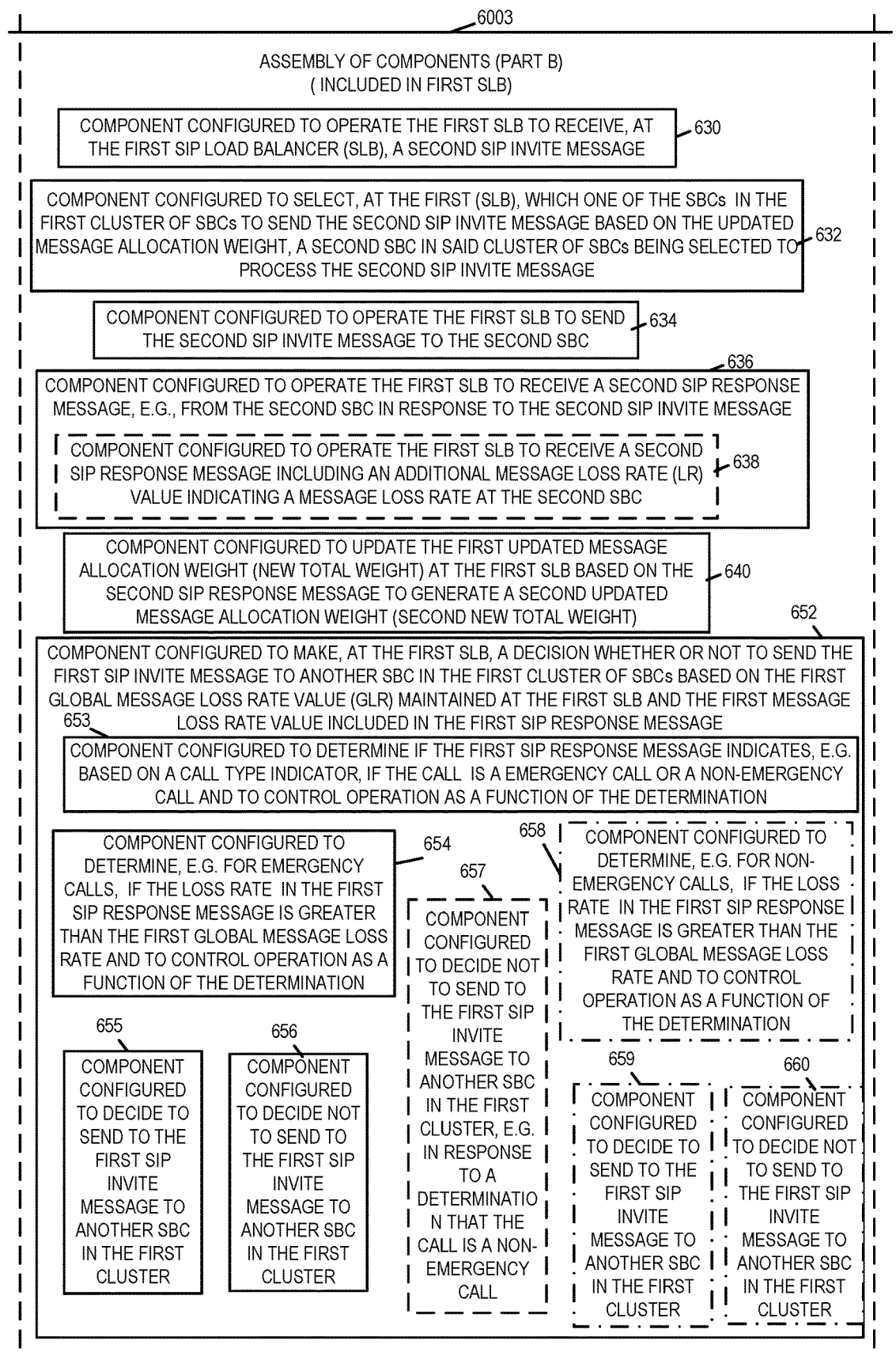
FIG. 6B is a second part of a drawing of an exemplary assembly of components which may be included in an exemplary SIP load balancer (SLB) in accordance with an exemplary embodiment.
Figure 6C:
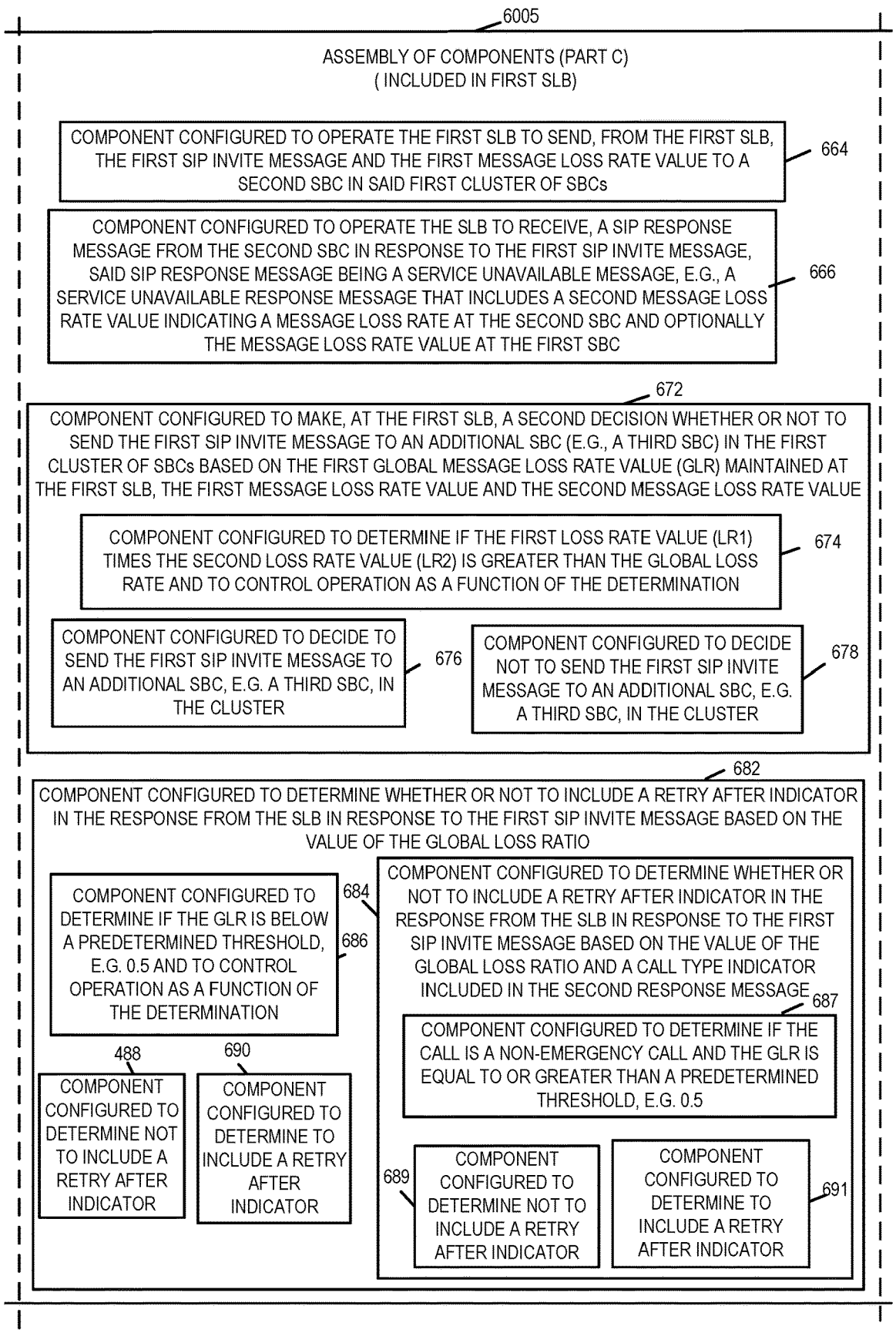
FIG. 6C is a third part of a drawing of an exemplary assembly of components which may be included in an exemplary SIP load balancer (SLB) in accordance with an exemplary embodiment.
Figure 6D:
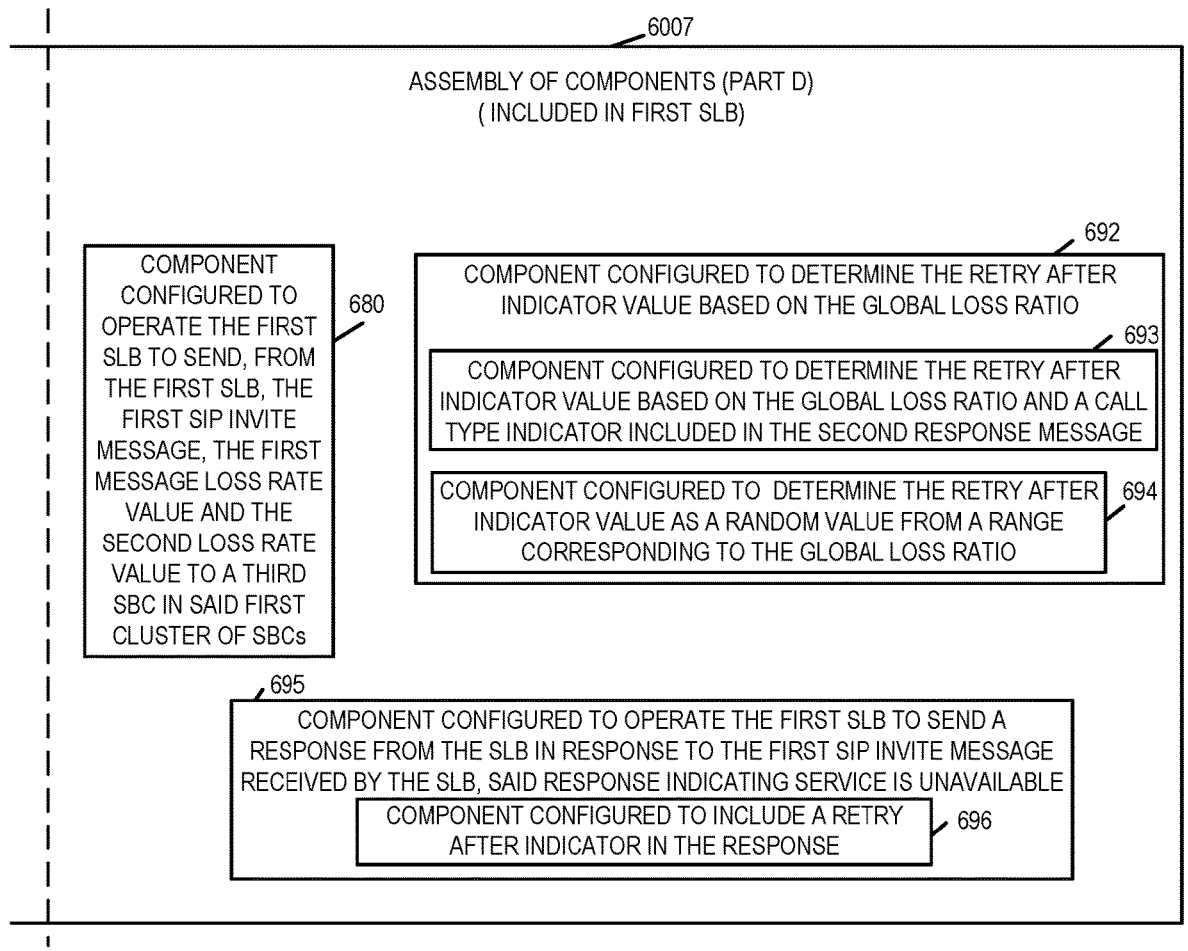
FIG. 6D is a fourth part of a drawing of an exemplary assembly of components which may be included in an exemplary SIP load balancer (SLB) in accordance with an exemplary embodiment.
Figure 6:
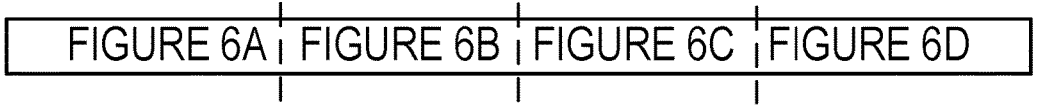
FIG. 6 comprises the combination of FIG. 6A, FIG. 6B, FIG. 6C and FIG. 6D.

FIG. 6 is a drawing of an exemplary assembly of components 600, comprising the combination of Part A 6001, Part B 6003, Part C 6005 and Part D 6007, which may be included in an exemplary SIP Load Balancer, e.g. a first SLB, in accordance with an exemplary embodiment. The exemplary SLB including assembly of components 600 is, e.g. any of SIP load balancers (204, 206, 208, 254, 256) of FIG. 2 or FIG. 3, and/or communications/computing device/node 500 of FIG. 5, which is a SLB.

The components in the assembly of components 600 can, and in some embodiments are, implemented fully in hardware within a processor, e.g., processor 506, e.g., as individual circuits. The components in the assembly of components 600 can, and in some embodiments are, implemented fully in hardware within the assembly of hardware components 519, e.g., as individual circuits corresponding to the different components. In other embodiments some of the components are implemented, e.g., as circuits, within processor 506 with other components being implemented, e.g., as circuits within assembly of components 519, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 510 of the SLB device 500, with the components controlling operation of SLB device 500 to implement the functions corresponding to the components when the components are executed by a processor e.g., processor 506. In some such embodiments, the assembly of components 600 is included in the memory 510 as assembly of software components 519. In still other embodiments, various components in assembly of components 600 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 600 is stored in the memory 510, the memory 510 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the SLB device 500 or elements therein such as the processor 506, to perform the functions of corresponding steps illustrated and/or described in the method of one or more of the flowcharts, signaling diagrams and/or described with respect to any of the Figures. Thus the assembly of components 600 includes various components that perform functions of corresponding one or more described and/or illustrated steps of an exemplary method, e.g. the exemplary method of flowchart 400 of FIG. 4.

Assembly of components 600 includes a component 603 configured to maintain a first global loss rate (GLR) value at the first SLB. Component 603 is configured to update the first GLR value based on message loss rate values received from a SBC indicating a message loss rate at the SBC. Message loss rate values are communicated to the first SLB in service unavailable response messages, e.g. 503 messages from the SBCs in a cluster of SBCs, e.g., the first cluster of SBCs over which the first SLB is performing load management. Component 603 includes a component 616 configured to update the first GLR value based on the message loss rate value indicating a message loss rate at a first SBC, a component 668 configured to update the first GLR value based on the message loss rate value indicating a message loss rate at a second SBC, and a component 669 configured to update the first GLR value based on the message loss rate value indicating a message loss rate at a third SBC.

Assembly of components 600 further includes a component 604 configured to operate the first SLB to receive a first SIP INVITE message, a component 606 configured to select, at the first SLB, which session border controller (SBC) in a first cluster of SBCs to send the first SIP INVITE message based on a message allocation weight determined based on message loss information corresponding to different SBCs in the first cluster of SBCs, said selecting including allocating a portion of incoming received SIP INVITE messages to an individual SBC based in a message loss rate corresponding to the individual SBC and said message allocation rate, said selecting including selecting a first SBC from the first cluster of SBCs to send said first SIP INVITE message, and a component configured to operate the first SLB to send the first SIP INVITE message to the first SBC.

Assembly of components 600 further includes a component 608 configured to operate the first SLB to receive a first SIP response message from the first SBC in response to the first SIP INVITE message, a component 61 configured to determine if the received first response message is a service unavailable response message, e.g. a 503 message, and to control operation as a function of the determination, and a component 613 configured to operate the first SLB to send the response message, e.g. a 200 ok message, to the source of the first SIP INVITE message, e.g., in response to a determination that the first response message is not a service unavailable message.

Assembly of components 600 further includes a component 612 configured to update the message allocation weight (total weight) at the first SLB based on the first SIP response message to generate a first updated message allocation weight (new weight total). Component 612 includes a component 614 configured to generate the first updated message allocation weight based on a total loss weigh generated from individual loss rate values reported by individual SBCs in the first cluster of SBCs.

Assembly of component 600 further includes a component 618 configured to determine a portion of incoming SIP INVITE messages received at the first SLB to allocate to individual SBCs in said first cluster of SBC based on the updated message allocation weight. Component 618 includes a component 620 configured to determine a portion of incoming SIP INVITE messages received at the first SLB to allocate to the first SLB. Component 620 includes a component 622 configured to determine a ratio of the message loss rare value for the first SBC to the updated message allocation weight. Assembly of components 600 further includes a component 624 configured to determine a portion of incoming SIP INVITE messages received at the first SLB to allocate to one of the individual SBCs in said first cluster of SBCs based on the updated message allocation weight and the individual loss rate value reported by one of the individual SBCs.

Assembly of components 600 further includes a component 630 configured to operate the first SLB to receive a second SIP INVITE message, a component 632 configured to select, at the first SLB, which session border controller (SBC) in a first cluster of SBCs to send the second SIP INVITE message based on the updated message allocation weight, a second SBC in said first cluster of SBCs being selected to process the second SIP INVITE message. Assembly of components 600 further includes a component 636 configured to operate the first SLB to receive a second SIP response message, e.g. from the second SBC in response to the second SIP INVITE message which was sent to the second SBC. Component 636 includes a component 638 configured to operate the first SLB to receive a second SIP response message including an additional message loss rate value indicating a message loss rate at the second SBC, a component 640 configured to update the first updated message allocation weight (new total weight) at the first SLB based on the second SIP response message to generate a second updated message allocation weight (a second new total weight).

Assembly of components 600 further includes a component 652 configured to make, at the first SLB, a decision whether or not to send the first SIP INVITE message to another SBC in the first cluster of SBCs based on the first global message loss rate (GLR) maintained at the first SLB and the first message loss rate value included in the first SIP response message. Component 652 includes a component 653 configured to determine if the first SIP response message indicates, e.g. based on a call type indicator, if the call is an emergency call or a non-emergency call and to control operation as a function of the determination.

In some embodiments, an indicator indicating an emergency call is included in a response message, e.g., a 503 response message, corresponding to call which has been identified by the SBC, which received the INVITE, as an emergency type call. In some embodiments, an indicator indicating a non-emergency call is included in a response message, e.g., a 503 response message, corresponding to call which has been identified by the SBC, which received the INVITE, as a non-emergency type call.

In some embodiments, an indicator indicating an emergency call is included in a response message, e.g., 503 response message, corresponding to an identified emergency call; however, no such call identifier indicator is included indicating a non-emergency call for an identified non-emergency call, and the SLB determines, e.g., infers, that the call is a non-emergency call by the lack of an indicator in the response message.

Assembly of components 600 further includes a component 654 configured to determine, e.g., for emergency calls, if the loss rate in the first SIP response message is greater than the first global message loss rate and to control operation as a function of the determination, a component 655 configured to decide (e.g., for emergency calls) to send the first SIP INVITE message to another SBC in the first cluster in response to a determination that the loss rate in the first SIP response message is greater than the first global message loss rate, a component 656 configured to decide (e.g., for emergency calls) not to send the first SIP INVITE message to another SBC in the first cluster in response to a determination that the loss rate in the first SIP response message is not greater than the first global message loss rate, a component 657 configured to decide not to send the first SIP INVITE message to another SBC in the first cluster in response to a determination that the call is a non-emergency call, a component 658 configured to determine, e.g., for non-emergency calls, if the loss rate in the first SIP response message is greater than the first global message loss rate and to control operation as a function of the determination, a component 659 configured to decide (e.g., for non-emergency calls) to send the first SIP INVITE message to another SBC in the first cluster in response to a determination that the loss rate in the first SIP response message is greater than the first global message loss rate, and a component 660 configured to decide (e.g., for non-emergency calls) not to send the first SIP INVITE message to another SBC in the first cluster in response to a determination that the loss rate in the first SIP response message is not greater than the first global message loss rate.

Assembly of components 600 further includes a component 664 configured to operate the first SLB to send the first SIP INVITE message and the first message loss rate value to a second SBC in said first cluster of SBCs, and a component 666 configured to operate the first SLB to receive a SIP response message from the second SBC in response to the first SIP INVITE message, said SIP response message being a service unavailable message, e.g. a service unavailable response message that include a second message loss rate value indicating a message loss rate at the second SBC and optionally including the first message loss rate value at the first SBC.

Assembly of components 600 further includes a component 672 configured to make, at the first SLB, a second decision whether or not to send the first SIP INVITE message to an additional SBC, e.g., a third SBC, in the first cluster of SBCs based on the first global message loss rate (GLR) maintained at the first SLB, the first message loss rate value and the second message loss rate value. Component 672 includes a component 674 configured to determine if the first loss rate value (LR1) times the second loss rate value (LR2) is greater than the global lass rate (GLR) and to control operation as a function of the determination, a component 676 configured to decide to send the first SIP INVITE message to an additional SBC, e.g. a third SBC, in the first cluster, e.g., in response to a determination that the first loss rate value times the second loss rate value is greater than the global loss rate, and a component 678 configured to decide not to send the first SIP INVITE message to an additional SBC in the first cluster, e.g. in response to a determination that the first loss rate value times the second loss rate value is not greater than the global loss rate. Assembly of components 600 further includes a component 680 configured to operate the first SLB to send from the first SLB, the first SIP INVITE message, the first message loss rate value and the second message loss rate value to a third SBC in the first cluster of SBCs, e.g., in response to a decision, e.g. by component 476, to send the first SIP INVITE message to an additional SBC, e.g. a third SBC, in the first cluster of SBCs.

Assembly of components 600 further include a component 682 configured to determine whether or not to include a retry after indicator in the response from the SLB, e.g. to the network device, in response to the first SIP INVITE message received by the SLB, based on the value of the global loss ratio. Component 682 includes a component 686 configured to determine if the GLR is below a predetermined threshold, e.g. 0.5, and to control operation as a function of the determination, a component 688 configured to determine not to include a retry after indicator, e.g. in response to a determination that the GLR is below the predetermined threshold, and a component 690 configured to determine to include a retry after indicator, e.g. in response to a determination that the GLR is greater than or equal to the predetermined threshold. Component 682 includes, in some embodiments, a component 684 configured to determine whether or not include a retry after indicator in the response from the SLB in response to the first SIP INVITE message based on the value of the global loss ratio and a call type indicator included in the second response message. Component 684 includes a component 687 configured to determine if the call is a non-emergency call and the GLR is equal to or greater than a predetermined threshold, e.g. 0.5, a component 689 configured to determine not to include a retry after indicator, e.g. in response to a determination that the call is an emergency call or the GLR is less than a predetermined threshold, and a component 691 configured to determine to include a retry after indicator, e.g. in response to a determination that the call is a non-emergency call and the GLR is greater than or equal to the predetermined threshold.

Assembly of components 600 further includes a component 692 configured to determine the retry after indicator value based on the global loss ratio. Component 692 includes one or both of a component 693 configured to determine the retry after indicator value based on the global loss ratio and a call type indicator included in the second response message and a component 694 configured to determine the retry after indicator value as a random value from a range corresponding to the global loss ratio. Assembly of components 600 further includes a component 695 configured to operate the first SLB to send a response from the SLB in response to the first SIP INVITE message received by the SLB, said response indicating service is unavailable. Component 495 includes a component 496 configured to include a retry after indicator in the response.

Figure 7:
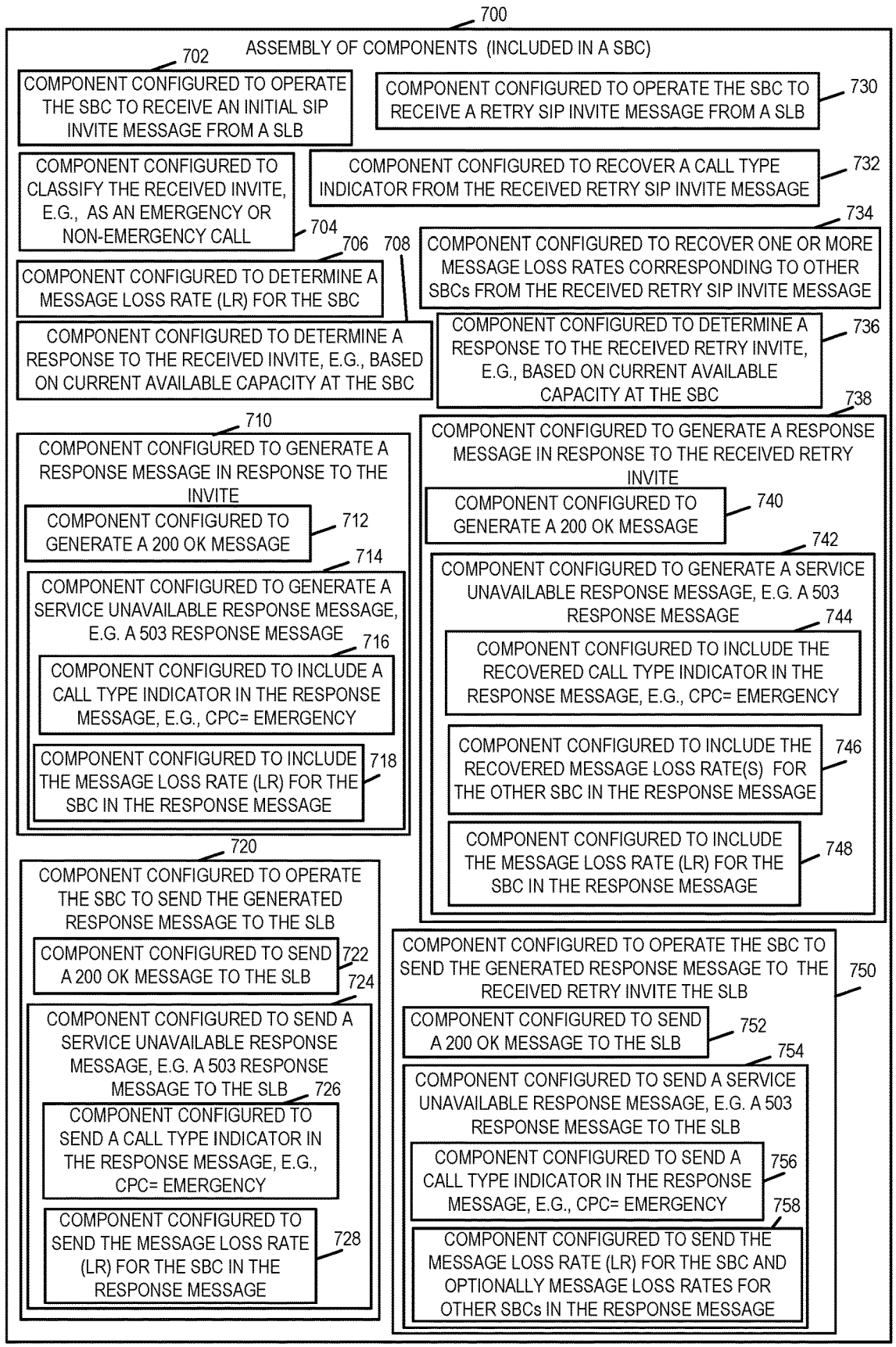
FIG. 7 is a drawing of an exemplary assembly of components which may be included in an exemplary Session Border Controller (SBC) in accordance with an exemplary embodiment.

FIG. 7 is a drawing of an exemplary assembly of components 700 which may be included in an exemplary Session Border Controller (SBC) in accordance with an exemplary embodiment. The exemplary SBC including assembly of components 700 is, e.g. any of SBCs load balancers (210, 212, 214, 216, 218, 220, 250, 252) of FIG. 2 or FIG. 3, and/or communications/computing device/node 500 of FIG. 5, which is a SBC.

The components in the assembly of components 700 can, and in some embodiments are, implemented fully in hardware within a processor, e.g., processor 506, e.g., as individual circuits. The components in the assembly of components 700 can, and in some embodiments are, implemented fully in hardware within the assembly of hardware components 519, e.g., as individual circuits corresponding to the different components. In other embodiments some of the components are implemented, e.g., as circuits, within processor 506 with other components being implemented, e.g., as circuits within assembly of components 519, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 510 of the SBC device 500, with the components controlling operation of SBC device 500 to implement the functions corresponding to the components when the components are executed by a processor e.g., processor 506. In some such embodiments, the assembly of components 700 is included in the memory 510 as assembly of software components 519. In still other embodiments, various components in assembly of components 700 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 700 is stored in the memory 510, the memory 510 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the SBC device 500 or elements therein such as the processor 506, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a component 702 configured to operate the SBC to receive an initial SIP invite message from a SIP Load Balancer (SLB), a component 704 configured to classify the received INVITE with regard to call type, e.g., as an emergency or non-emergency call, and a component 706 configured to determine a message loss rate for the SBC, e.g. a weighted sliding average of INVITE rejected/INVITE received, measured in an interval of time, e.g., a couple of seconds. In some embodiments, the interval of time used for the loss ratio determination is a configurable value. Assembly of components 700 further includes a component 708 configured to determine a response to the received INVITE, e.g., based on current available capacity at the SBC and, in some embodiments, the type of call.

Assembly of components 700 further includes a component 710 configured to generate a response message in response to the INVITE. Component 710 includes a component 712 configured to generate a 200 OK response message, and a component 714 configured to generate a service unavailable response message, e.g., a 503 response message. Component 714 includes a component 716 configured to include a call type indicator, e.g., CPC=emergency or CPC=non-emergency, in the response message, and a component 718 configured to include the message LR rate for the SBC in the response message. In some embodiments, component 716 is configured to include a call type indicator (CPC=emergency) in a response message corresponding to a call which has been classified by the SBC as an emergency call and is configured to not include a call type indicator in the response message when the call has been classified by the SBC as a non-emergency call, e.g., with the omission of the explicit call type indicator in the service unavailable response message implicitly indicating to the SLB that the call has been classified as a non-emergency type call by the SBC. Assembly of components 700 further includes a component 720 configured to operate the SBC to send the generated response message to the SLB. Component 720 includes a component 722 configured to send a 200 ok message to the SLB in response to the received INVITE message, and a component 724 configured to send a service unavailable response message, e.g., a 503 response message, to the SLB in response to the received INVITE message. Component 724 includes a component 726 configured to send a call type, e.g., CPC=emergency, in the response message, and a component 728 configured to send the message loss rate (LR) for the SBC in the response message.

Assembly of components 700 further includes a component 730 configured to operate the SBC to receive a retry SIP INVITE message from a SLB, a component 732 configured to recover a call type indicator from the received retry SIP INVITE message, a component 734 configured to recover one or more message loss rates corresponding to other SBCs from the received retry SIP INVITE message, said other SBCs having previously responded negatively to the SIP INVITE, and a component 736 configured to determine a response to the received retry INVITE, e.g. based on current available capacity at the SBC, and in some embodiments, the call type.

Assembly of components 700 further includes a component 738 configured to generate a response message in response to the received retry SIP INVITE message. Component 738 includes a component 740 configured to generate a 200 OK response message, and a component 742 configured to generate a service unavailable response message, e.g., a 503 response message. Component 742 includes a component 744 configured to include the recovered call type indicator, e.g., CPC=emergency or CPC=non-emergency, in the response message, a component 746 configured to include the recovered message loss rate(s) for the other SBCs (which previously rejected the INVITE) in the response message and a component 748 configured to include the message LR rate for the SBC in the response message. Assembly of components 700 further includes a component 750 configured to operate the SBC to send the generated response message to the received retry SIP INVITE message to the SLB. Component 750 includes a component 752 configured to send a 200 ok message to the SLB in response to the received retry INVITE message, and a component 754 configured to send a service unavailable response message, e.g., a 503 response message, to the SLB in response to the received retry INVITE message. Component 754 includes a component 756 configured to send a call type, e.g., CPC=emergency, in the response message, and a component 758 configured to send the message loss rate (LR) for the SBC and optionally message loss rate(s) for other SBC(s) (which previously rejected the INVITE) in the response message.

Figure 8:
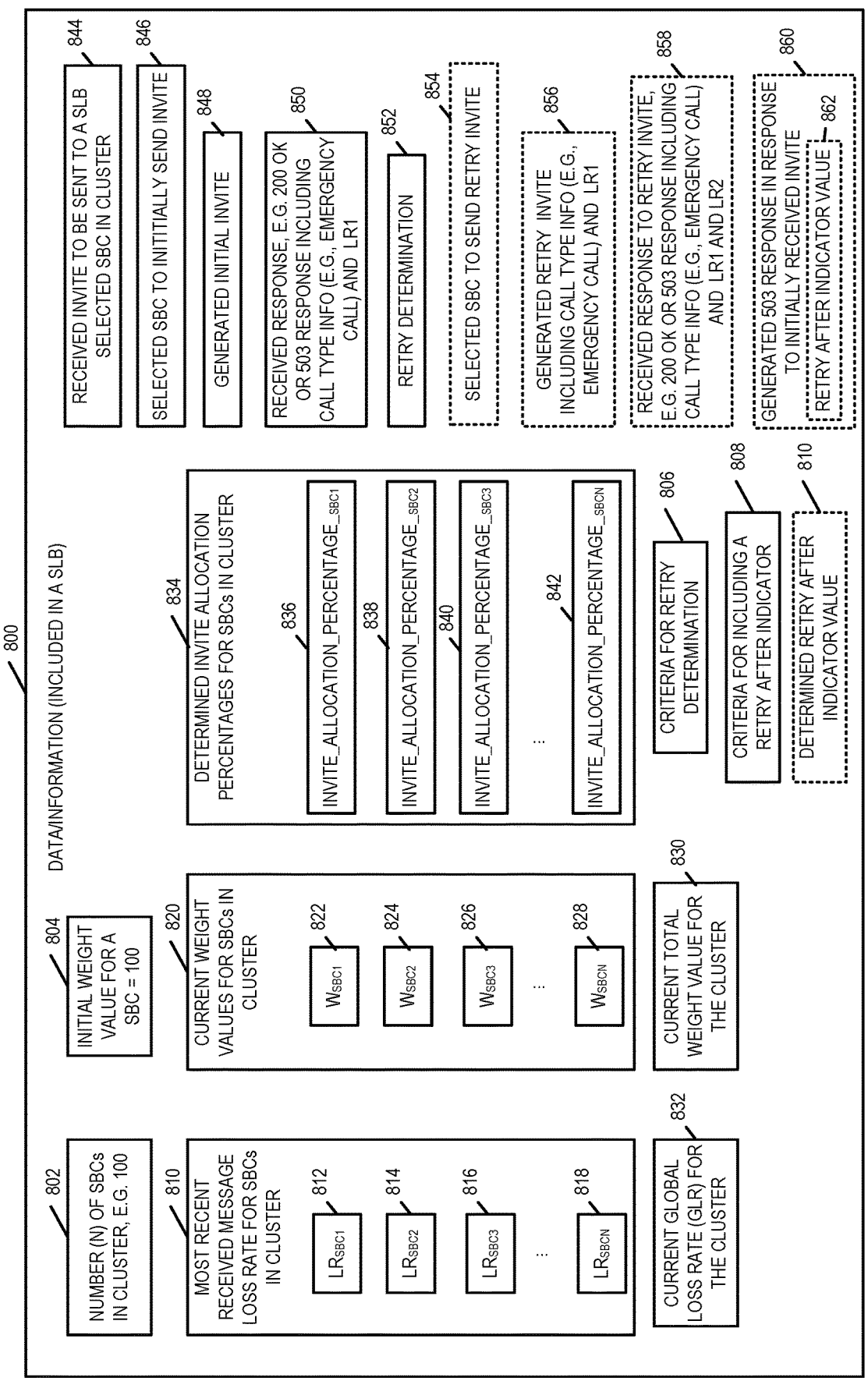
FIG. 8 is a drawing of exemplary data/information which may be included in an exemplary SLB in accordance with an exemplary embodiment.

FIG. 8 is a drawing of exemplary data/information 800 which may be included in an exemplary SLB, e.g., SLB 204 of FIG. 2 and FIG. 3, in accordance with an exemplary embodiment. Data/information 200 includes a number (N) 802 of SBCs in the cluster, (e.g., N=100), an initial weight value 804 for a SBC, (e.g. 100), criteria 806 for retry determination, e.g., criteria used to determine if the SBC should send a rejected INVITE to another SBC in the cluster, and criteria 808, e.g., threshold limits, for including a retry after indicator, e.g. in a 503 message being sent to a device which sent an INVITE to the SLB. Data/information may, and sometimes does, include a determined retry after indicator value 810.

Data/information 800 further includes a set 810 of the most recently received message loss rates for SBCs in the cluster ($LR_{SBC1}$ 812, $LR_{SBC2}$ 814, $LR_{SBC3}$ 816, ..., $LR_{SBCN}$ 818), a set 820 of current weight values for SBCs in the cluster ($W_{SBC1}$ 822, $W_{SBC2}$ 824, $W_{SBC3}$ 826, ..., $W_{SBCN}$ 828), a determined current total weight value 830 for the cluster, a determined current global loss rate (GLR) 832 for the cluster, and a set 834 of determined INVITE allocation percentages for SBCs in the cluster (INVITE_Allocation_Percentage $_{SBC1}$ 836, INVITE_Allocation_Percentage $_{SBC2}$ 838, INVITE_Allocation_Percentage $_{SBC3}$ 840, ..., INVITE_Allocation_Percentage $_{SBCN}$ 842). Data/information 800 further includes a received SIP INVITE 844 to be sent to a SBL selected SBC in the cluster, a selected SBC 846 to initially send the INVITE, a generated INITIAL INVITE message 848, a received response message 850 to the initial INVITE, e.g., a 200 ok response message or a 503 response message including a call type information, e.g., information classifying the call as an emergency call or a non-emergency call, and loss rate information (LR1) corresponding to the SBC which sent the rejection, a retry determination result 852, e.g. information indicating that the SLB should try to send the rejected INVITE to another SBC in the cluster or information indicating that the SLB should not send the rejected INVITE to another SBC in the cluster. Data/information may, and sometimes does, further include information 854 identifying the selected SBC in the cluster to send the retry INVITE message, a generated retry INVITE message 856, including call type information, e.g. cpc=emergency, and LR1, a received response message 858 to the retry INVITE, e.g., a 200 ok response message or a 503 response message including call type information, e.g., information classifying the call as an emergency call or a non-emergency call, and loss rate information (LR1) corresponding to the first SBC which sent the rejection to the initial INVITE and loss rate information (LR2) corresponding to the second SBC which sent the rejection to the retry INVITE, and a generated 503 response 860, which is a response to the received INVITE. In some embodiments, the generated 503 response message 860 includes a retry after indicator value 862, e.g., indicating a delay time to be observed before re-sending INVITE to the SLB.

Using the foregoing methods and/or apparatus a system can effectively and efficiently distribute traffic, e.g., incoming SIP Invite requests, among processing devices, e.g., a cluster of SBCs or SBC instances. The processing devices of the cluster are de-coupled from each other. For example, in a cluster of SBCs, each SBC of the cluster does not know about or is unaware of other the SBCs in the cluster and/or the capabilities and/or loading on the other SBCs in the cluster. This de-coupling of the SBCs of the cluster allows for dynamic scaling of the cluster wherein SBCs can be added to or removed from the cluster without having to update the SBCs remaining in the cluster. The front end SLB(s) which distribute traffic generate a global loss rate based on the loss rate reported from the SBCs to which they are distributing traffic. When there are N different SLBs distributing traffic to the SBCs of the cluster, each of the N different SLBs generate global loss rates individually and independently without synchronizing states or global loss rates among the SLBs. In this way, the SLBs do not need to exchange messages to synchronize the global loss rate but can operate independently which also allows for dynamically scaling a system. In the various embodiments of the invention, the front end devices which are load balancers, e.g., SIP load balances, responsible for distributing the incoming traffic, e.g., SIP INVITE requests, among the processing devices/entities of the cluster, e.g., SBCs, are de-coupled from the back end devices, the processing devices/entities in that the front end devices, e.g., load balancers, are able to distribute traffic using the loss ratios calculated and provided the processing entities/devices to the front end devices without the front end devices knowing the different processing capacities of the individual processing entities/devices of the cluster to which traffic is being distributed.

Numbered List of Exemplary Method Embodiments:

Method Embodiment 1. A communications method, the method comprising: receiving (404), at a first Session Initiation Protocol (SIP) load balancer (SLB), a first SIP INVITE message; selecting (406), at the first SLB, which Session Border Controller (SBC) in a first cluster of SBCs to send the first SIP invite message based on a message allocation weight (total weight) determined based on message loss information corresponding to different SBCs in the first cluster of SBCs, said selecting including allocating a portion of incoming received SIP INVITE messages to an individual SBC based on a message loss rate corresponding to the individual SBC and said message allocation rate, said selecting including selecting a first SBC from the first cluster of SBCs to send said first SIP INVITE message; sending (408) the first SIP INVITE message to the first SBC; and receiving (410) a first SIP response message (e.g., 503 response or 200 ok response) from the first SBC in response to the first SIP INVITE message.

Method Embodiment 1A. The communications method of claim 1A, wherein the first SIP response indicates acceptance or rejection of the first SIP INVITE message (e.g., by the type of response which is received 200 Ok or 503).

Method Embodiment 1AA. The communications method of method embodiment 1, wherein the first SIP response message is a SIP 503 response message indicating rejection of the first SIP invite message, said SIP 503 response message including a call type indicator.

Method Embodiment 1AB. The communications method of method embodiment 1AA, wherein the call type indicator indicates an emergency call, said call type having been determined by the first SBC.

Method Embodiment 1AC. The communications method of method embodiment 1AB, wherein the call type indicator is included in proprietary parameter of the first SIP response message.

Method Embodiment 1ACC. The communications method of method embodiment 1AC, wherein the proprietary parameter is included in the first SIP response message Request-URI header.

Method Embodiment 1AD. The communications method of method embodiment 1AA, wherein the first SLB makes a determination as to whether or not to retry sending the first SIP INVITE message to another of the SBCs of the first cluster of SBCs based on the call type indicator.

Method Embodiment 1AD1. The communications method of method embodiment 1AD, wherein the call type indicator indicates an emergency call or an non-emergency call, said call type having been determined by the first SBC.

Method Embodiment 1AE. The communications method of method embodiment 1AA, wherein the call type indicator is only included for emergency calls.

Method Embodiment 2. The communications method of method embodiment 1, further comprising: updating (412) the message allocation weight (total weight) at the first SLB based on the first SIP response message (sum individual loss rates for SBCs) to generate a first updated message allocation weight (a new total weight).

Method Embodiment 2A. The communications method of method embodiment 2, wherein updating (412) the message allocation weight includes generating (414) the first updated message allocation weight based on a total loss weight generated from individual loss rate values reported by individual SBCs in the first cluster of SBCs (consider example 1 where total weight is sum of individual loss rate values expressed in short hand form as (10*30+ 90*100=9300)).

Method Embodiment 2B. The communications method of method embodiment 2A, further comprising: determining (418) a portion of incoming SIP INVITE messages received at the first SLB to allocate to individual SBCs in said first cluster of SBCs based on the first updated message allocation weight.

Method Embodiment 2B1 The communications method of method embodiment 2A, further comprising: determining (424) a portion of incoming SIP INVITE messages received at the first SLB to allocate to one of the individual SBCs in said first cluster of SBCs based on the first updated message allocation weight and the individual loss rate value reported by the one of the individual SBCs.

Method Embodiment 2C. The communications method of method embodiment 2B wherein said step of determining (418) the portion of incoming SIP INVITE messages to allocate to the first SBC includes: determining (422) a ratio of the message loss rate value for the first SBC to the first updated message allocation weight. (Consider example 1 SBC 1 if in the 10 with the higher loss rate will be allocated 30/9300 of the incoming invite messages to process).

Method Embodiment 3. The communications method of method embodiment 2, further comprising: receiving (430), at a first SIP load balancer (SLB), a second SIP INVITE message; selecting (432), at the first SLB, which one of the SBCs in the first cluster of SBCs to send the second SIP INVITE message based on the first updated message allocation weight (new total weight), a second SBC in said cluster of SBCs being selected to process the second SIP INVITE message.

Method Embodiment 4. The communications method of method embodiment 3, further comprising: receiving, at the first SLB, a second SIP response message including a second message loss rate value (LR) indicating a message loss rate at the second SBC; and updating (440) the first updated message allocation weight (new total weight) at the first SLB based on the second SIP response message (sum individual loss rates for SBCs) to generate a second updated message allocation weight (a second new total weight).

Method Embodiment 5. The method of method embodiment 2, further comprising: maintaining (403) a first global message loss rate (GLR) value at the first SLB, maintaining the first global message loss rate value including updating (416) the first GLR value based on the message loss rate value indicating a message loss rate (LR) at the first SBC.

Method Embodiment 6. The communications method of method embodiment 1, wherein the first SIP response message is a service unavailable response message (e.g., SIP 503 message) that includes a first message loss rate (LR) value indicating a message loss rate at the first SBC, the method further comprising: making (452), at the first SLB, a decision whether or not to send the first SIP invite message to another SBC in the first cluster based on a first global message loss rate (GLR) value maintained at the first SLB and the first message loss rate value included in the first SIP response message (e.g., resend message to another SBC in cluster when loss rate in first SIP response message is greater than the first GLR).

Method Embodiment 6A. The communications method of method embodiment 6, wherein the first SIP response message is a SIP 503 response message indicating rejection of the first SIP invite message, said SIP 503 response message including a call type indicator; and wherein said making (452), at the first SLB, the decision whether or not to send the first SIP invite message to another SBC in the first cluster is further based (458) on the call type indicator included in the SIP 503 response message.

Method Embodiment 6AA. The communications method of method embodiment 6A, wherein the call type indicator indicates whether the call is an emergency call or a non-emergency call.

Method Embodiment 6AAA. The communications method of method embodiment 6AA, wherein when the call type indicator indicates the call is non-emergency call, said first SLB makes the determination not to send the first SIP invite message to another SBC in the first cluster.

Method Embodiment 7. The communications method of method embodiment 6, wherein said first message loss rate value included in the first SIP response message is greater than the first GLR value; and wherein said decision is a decision to send the first SIP invite message to another SBC (e.g., a second SBC) in the first cluster, the method further comprising: sending (464), from the first SLB, the first SIP invite message and the first message loss rate value to a second SBC in said first cluster of SBCs.

Method Embodiment 8. The method of method embodiment 7, further comprising: receiving (466) a second SIP response message (e.g., 503 service unavailable response) from the second SBC in response to the first SIP invite message, said second SIP response message being a service unavailable message; and maintaining (403) a first global message loss rate (GLR) value at the first SLB, said maintaining the first global message loss rate value including updating (416) the first GLR value based on the first message loss rate corresponding to the first SBC indicated in said first SIP response message.

Method Embodiment 9. The communications method of method embodiment 8, further comprising: receiving (430), at the first SIP load balancer (SLB), a second SIP INVITE message; sending (434) the second SIP invite message to the second SBC in the cluster of SBCs; receiving (436) from the second SBC a response to the second SIP invite message, said response to the second SIP invite message including (438) an additional message loss rate (LR) value indicating a message loss rate (LR) at the second SBC; and wherein maintaining (403) the first global message loss rate (GLR) value at the first SLB includes updating (468) the first GLR value based on the additional message loss rate value indicating a message loss rate (LR) at the second SBC.

Method Embodiment 10. The communications method of method embodiment 8, wherein the second SIP response message is a service unavailable response message (e.g., SIP 503 message) that includes a second message loss rate value (LR) (and optionally the first LR value) indicating a message loss rate at the second SBC, the method further comprising: making (472), at the first SLB, a second decision whether or not to send the first SIP invite message to an additional SBC (e.g., a third SBC) in the first cluster based on the first global message loss rate (GLR) value maintained at the first SLB, the first message loss rate value and the second message loss rate value (e.g., resend message to a third SBC in cluster when the first loss rate value (LR1) times the second loss rate value (LR2) is greater than the first GLR value).

Method Embodiment 11. The method of method embodiment 10, further comprising: when the decision at the first SLB is not to send the first SIP invite message to an additional SBC, sending (494) a response from the SLB in response to the first SIP invite message indicating service is unavailable (a SIP 503 message).

Method Embodiment 12. The method of method embodiment 11, further comprising: determining (482) whether or not to include a retry after indicator in the response from the SLB in response to the first SIP invite message based on the value of the global loss ratio.

Method Embodiment 12A. The method of method embodiment 12, wherein said determining (482) whether or not to include a retry after indicator in the response from the SLB in response to the first SIP invite message is further based (484) on a call type indicator included in the second response message.

Method Embodiment 12B. The method of method embodiment 11, further comprising: determining (493) a retry after indicator value to be included in a response message from the SLB in response to the first SIP invite message based on the value of the global loss ratio and a call type indicator included in the second response message.

Method Embodiment 13. The method of method embodiment 12, wherein determining (482) whether or not to include a retry after indicator in the response from the SLB in response to the first SIP invite message based on the value of the global loss ratio includes: determining (488) not to include a retry after indicator when the global loss ratio is below a predetermined threshold (e.g., below 0.5).

Method Embodiment 14 The method of method embodiment 13, wherein determining (482) whether or not to include a retry after indicator in the response from the SLB in response to the first SIP invite message based on the value of the global loss ratio includes: determining (490) to include a retry after indicator when the global loss ratio is equal to or above the predetermined threshold (e.g., below 0.5).

Method Embodiment 15 The method of method embodiment 14, wherein determining (482) whether or not to include a retry after indicator in the response from the SLB in response to the first SIP invite message based on the value of the global loss ratio includes determining (490) to include a retry after indicator; and wherein the method further includes: determining (492) the retry after indicator value (# of second to wait before sending of SIP messages to the first cluster) based on the global loss ratio (e.g., a larger retry indicator value being supplied when the global loss ratio is above a second global loss ratio threshold (0.7) than when below the second threshold and above the first threshold used to trigger inclusion of a retry threshold).

Method Embodiment 16 The method of method embodiment 15, further comprising: updating (416, 468, 469) the global loss ratio based on the loss ratio included in one or more response messages.

Method Embodiment 17 The method of method embodiment 16, wherein the communications system (200) includes multiple SLBs (204, 206, 208), e.g., a SLB (204, 206, 208) independently maintaining a GLR (205, 207, 209) without communicating its GLR or total weight to other SLBs sending SIP messages to SBCs in the first cluster.

Method Embodiment 18 A communications method, the method comprising: receiving (404), at a first SIP load balancer (SLB), a first SIP INVITE message; selecting (406), at the first SLB, which one of the SIP processing entities in a first SIP processing entities cluster to send the first SIP invite message based on a message allocation weight (total weight) determined based on message loss information corresponding to different SIP processing entities in the first cluster of SIP processing entities, said selecting including allocating a portion of incoming received SIP invite messages to an individual SIP processing entity based on a message loss rate corresponding to the individual SIP processing entity and said message allocation rate, said selecting including selecting a first SIP processing entity to receive said first SIP invite message; sending (408) the first SIP INVITE message to the first SIP processing entity; and receiving (410) a first SIP response message (e.g., 503 response message or 200 ok responses message) from the first SIP processing entity in response to the first SIP invite message.

Method Embodiment 18A. The communications method of method embodiment 18, wherein the SIP processing entities of the cluster of SIP processing entities are Session Border Controllers.

Method Embodiment 18B. The communications method of method embodiment 18A, wherein the Session Border Controllers are virtual Session Border Controllers executing in a cloud system.

Method Embodiment 19. The communications method of method embodiment 1, wherein the SLB receives from the first SBC a first message loss rate value (LR) indicating a message loss rate at the first SBC, said first message loss rate value (LR) being a parameter attached to or included in a message (e.g., SIP message) received from the first SBC.

Method Embodiment 20. The communications method of method embodiment 19, further comprising: when said first SIP response message from the first SBC in response to the first SIP INVITE message is a message rejecting the SIP INVITE message making, at the first SLB, a decision whether or not to send the first SIP invite message to another SBC in the first cluster based on a first global message loss rate value (GLR) maintained at the first SLB and the first message loss rate value received from the first SBC.

Method Embodiment 21. The communications method of method embodiment 20, wherein the first SIP response is the message received at the SLB from the first SBC in which the first message loss rate value is included.

Method Embodiment 22. The communication method of method embodiment 20, wherein the message including the first message loss rate value is a SIP message dedicated for sending message loss rate information.

Method Embodiment 23. The communications method of method embodiment 20, further comprising: periodically generating, by the first SBC, current message loss rate values; transmitting, by the first SBC, the periodically generated current message loss rate values to the SLB; receiving, by the SLB, the periodically generated current message loss rate values; updating, by the SLB, the global message loss rate value, based on the received periodically generated current message loss rate value; and wherein said first message loss rate value is one of said periodically generated current loss rate values.

Method Embodiment 24. A communications method, the method comprising: receiving, at a first Session Initiation Protocol (SIP) load balancer (SLB), a first SIP INVITE message; selecting (906), at the first SLB, which Session Border Controller (SBC) in a first cluster of SBCs to send the first SIP invite message based on a message allocation weight (total weight) determined based on resource utilization information corresponding to different SBCs in the first cluster of SBCs, said selecting including allocating a portion of incoming received SIP INVITE messages to an individual SBC based on a resource utilization value corresponding to the individual SBC and said message allocation rate, said selecting including selecting a first SBC from the first cluster of SBCs to send said first SIP INVITE message; ending (908) the first SIP INVITE message to the first SBC; and receiving a first SIP response message (e.g., 503 response or 200 ok response) from the first SBC in response to the first SIP INVITE message.

Method Embodiment 25. The communications method of method embodiment 24, wherein the SLB receives from the first SBC a first resource utilization value indicating a first amount of resources being utilized at the first SBC, said first resource utilization value being a parameter attached to or included in a message (e.g., SIP message) received from the first SBC.

Method Embodiment 26. The communications method of method embodiment 25, further comprising: when said first SIP response message from the first SBC in response to the first SIP INVITE message is a message rejecting the SIP INVITE message making, at the first SLB, a decision whether or not to send the first SIP invite message to another SBC in the first cluster based on a first global resource utilization value (GRU) maintained at the first SLB and the first resource utilization value received from the first SBC.

Numbered List of Exemplary System Embodiments:

System Embodiment 1. A communications system (200) comprising: a first Session Initiation Protocol (SIP) load balancer (SLB) (204) including: a first processor (506) configured to: operate the first SLB (204) to receive (404) a first SIP INVITE message; select (406), at the first SLB, which Session Border Controller (SBC) in a first cluster (230) of SBCs to send the first SIP invite message based on a message allocation weight (total weight) determined based on message loss information corresponding to different SBCs in the first cluster of SBCs, said selecting including allocating a portion of incoming received SIP INVITE messages to an individual SBC based on a message loss rate corresponding to the individual SBC and said message allocation rate, said selecting including selecting a first SBC (e.g., SBC 214) from the first cluster of SBCs to send said first SIP INVITE message; operate the first SLB (204) to send (408) the first SIP INVITE message to the first SBC; and operate the first SLB to receive (410) a first SIP response message (e.g., 503 response or 200 ok response) from the first SBC in response to the first SIP INVITE message.

System Embodiment 1A. The communications system (200) of System Embodiment 1A, wherein the first SIP response indicates acceptance or rejection of the first SIP INVITE message (e.g., by the type of response which is received 200 Ok or 503).

System Embodiment 1AA. The communications system (200) of System Embodiment 1, wherein the first SIP response message is a SIP 503 response message indicating rejection of the first SIP invite message, said SIP 503 response message including a call type indicator.

System Embodiment 1AB. The communications system (200) of System Embodiment 1AA, wherein the call type indicator indicates an emergency call, said call type having been determined by the first SBC.

System Embodiment 1AC. The communications system (200) of System Embodiment 1AB, wherein the call type indicator is included in proprietary parameter of the first SIP response message.

System Embodiment 1ACC. The communications system (200) of System Embodiment 1AC, wherein the proprietary parameter is included in the first SIP response message Request-URI header.

System Embodiment 1AD. The communications system (200) of System Embodiment 1AA, wherein the first SLB makes a determination as to whether or not to retry sending the first SIP INVITE message to another of the SBCs of the first cluster of SBCs based on the call type indicator.

System Embodiment 1AD1. The communications system (200) of System Embodiment 1AD, wherein the call type indicator indicates an emergency call or an non-emergency call, said call type having been determined by the first SBC.

System Embodiment 1AE. The communications system (200) of System Embodiment 1AA, wherein the call type indicator is only included for emergency calls.

System Embodiment 2. The communications system (200) of System Embodiment 1, wherein said first processor is further configured to: update (412) the message allocation weight (total weight) at the first SLB based on the first SIP response message (sum individual loss rates for SBCs) to generate a first updated message allocation weight (a new total weight).

System Embodiment 2A. The communications system (200) of System Embodiment 2, wherein said first processor is configured generate (414) the first updated message allocation weight based on a total loss weight generated from individual loss rate values reported by individual SBCs in the first cluster of SBCs, as part of being configured to update (412) the message allocation weight (consider example 1 where total weight is sum of individual loss rate values expressed in short hand form as (10*30+ 90*100=9300)).

System Embodiment 2B. The communications system (200) of System Embodiment 2A, wherein said first processor is further configured to: determine (418) a portion of incoming SIP INVITE messages received at the first SLB to allocate to individual SBCs in said first cluster of SBCs based on the first updated message allocation weight.

System Embodiment 2B1. The communications system (200) of System Embodiment 2A, wherein said first processor is further configured to: determine (424) a portion of incoming SIP INVITE messages received at the first SLB to allocate to one of the individual SBCs in said first cluster of SBCs based on the first updated message allocation weight and the individual loss rate value reported by the one of the individual SBCs.

System Embodiment 2C. The communications system (200) of System Embodiment 2B wherein said first processor is configured to: determine (422) a ratio of the message loss rate value for the first SBC to the first updated message allocation weight, as part of being configured to determine (418) the portion of incoming SIP INVITE messages to allocate to the first SBC. (Consider example 1, the first SBC, if it is in the set of 10 SBCs with the higher loss rate, will be allocated 30/9300 of the incoming invite messages to process).

System Embodiment 3. The communications system (200) of System Embodiment 2, wherein said first processor is further configured to: operate the first SLB to receive (430), at a first SIP load balancer (SLB), a second SIP INVITE message; select (432), at the first SLB, which one of the SBCs in the first cluster of SBCs to send the second SIP INVITE message based on the first updated message allocation weight (new total weight), a second SBC (e.g., SBC 72 218) in said cluster of SBCs being selected to process the second SIP INVITE message.

System Embodiment 4. The communications system (200) of System Embodiment 3, wherein said first processor is further configured to: operate the first SLB to receive (436), at the first SLB, a second SIP response message including a second message loss rate value (LR) indicating a message loss rate at the second SBC; and update (440) the first updated message allocation weight (new total weight) at the first SLB based on the second SIP response message (sum individual loss rates for SBCs) to generate a second updated message allocation weight (a second new total weight).

System Embodiment 5. The communications system (200) of System Embodiment 2, wherein said first processor is further configured to: maintain (403) a first global message loss rate (GLR) value (e.g. GLR 1 205) at the first SLB (204), maintaining the first global message loss rate value including updating (416) the first GLR value based on the message loss rate value indicating a message loss rate (LR) at the first SBC.

System Embodiments 6-17 relate to the retry decision process where the SLB may decide whether or not to send an invite that was rejected for processing at one SBC to another SBC before giving up on processing the SIP invite using the first cluster of SBCs.

System Embodiment 6. The communications system (200) of System Embodiment 1, wherein the first SIP response message is a service unavailable response message (e.g., SIP 503 message) that includes a first message loss rate (LR) value indicating a message loss rate at the first SBC; and wherein said first processor is further configured to: make (452), at the first SLB (204), a decision whether or not to send the first SIP invite message to another SBC (e.g., SBC 72 218) in the first cluster (230) based on a first global message loss rate (GLR) value maintained at the first SLB and the first message loss rate value included in the first SIP response message (e.g., resend message to another SBC in cluster when loss rate in first SIP response message is greater than the first GLR).

System Embodiment 6A. The communications system (200) of System Embodiment 6, wherein the first SIP response message is a SIP 503 response message indicating rejection of the first SIP invite message, said SIP 503 response message including a call type indicator; and wherein said making (452), at the first SLB, the decision whether or not to send the first SIP invite message to another SBC in the first cluster is further based (458) on the call type indicator included in the SIP 503 response message.

System Embodiment 6AA. The communications system (200) of System Embodiment 6A, wherein the call type indicator indicates whether the call is an emergency call or a non-emergency call.

System Embodiment 6AAA. The communications system (200) of System Embodiment 6AA, wherein when the call type indicator indicates the call is non-emergency call, said first SLB makes the determination not to send the first SIP invite message to another SBC in the first cluster.

System Embodiment 7. The communications system (200) of System Embodiment 6, wherein said first message loss rate value included in the first SIP response message is greater than the first GLR value; and wherein said decision is a decision to send the first SIP invite message to another SBC (e.g., a second SBC (e.g., SBC 72 218)) in the first cluster; and wherein said first processor is further configured to: operate the first SLB to send (464), from the first SLB, the first SIP invite message and the first message loss rate value to a second SBC in said first cluster of SBCs.

System Embodiment 8. The communications system (200) of System Embodiment 7, wherein said first processor is further configured to: operate the first SLB to receive (466) a second SIP response message (e.g., 503 service unavailable response) from the second SBC in response to the first SIP invite message, said second SIP response message being a service unavailable message; and maintain (403) a first global message loss rate (GLR) value at the first SLB, said maintaining the first global message loss rate value including updating (416) the first GLR value based on the first message loss rate corresponding to the first SBC indicated in said first SIP response message.

System Embodiment 9. The communications system (200) of System Embodiment 8, wherein said first processor is further configured to: operate the first SLB to receive (430), at the first SIP load balancer (SLB), a second SIP INVITE message; operate the first SLB to send (434) the second SIP invite message to a second SBC (e.g., SBC 72 218) in the cluster of SBCs; operate the first SLB to receive (436) from the second SBC a response to the second SIP invite message, said response to the second SIP invite message including (438) an additional message loss rate (LR) value indicating a message loss rate (LR) at the second SBC; and wherein maintaining (403) the first global message loss rate (GLR) value at the first SLB includes updating (468) the first GLR value based on the additional message loss rate value indicating a message loss rate (LR) at the second SBC.

System Embodiment 10. The communications system (200) of System Embodiment 8, wherein the second SIP response message is a service unavailable response message (e.g., SIP 503 message) that includes a second message loss rate value (LR) (and optionally the first LR value) indicating a message loss rate at the second SBC; and wherein said first processor is further configured to: make (472), at the first SLB, a second decision whether or not to send the first SIP invite message to an additional SBC (e.g., a third SBC) in the first cluster based on the first global message loss rate (GLR) value maintained at the first SLB, the first message loss rate value and the second message loss rate value (e.g., resend message to a third SBC in cluster when the first loss rate value (LR1) times the second loss rate value (LR2) is greater than the first GLR value).

System Embodiment 11. The communications system (200) of System Embodiment 10, wherein said first processor is further configured to: when the decision at the first SLB is not to send the first SIP invite message to an additional SBC, operate the first SLB to send (494) a response from the SLB in response to the first SIP invite message indicating service is unavailable (a SIP 503 message).

System Embodiment 12. The communications system (200) of System Embodiment 11, wherein said first processor is further configured to: determine (482) whether or not to include a retry after indicator in the response from the SLB in response to the first SIP invite message based on the value of the global loss ratio.

System Embodiment 12A. The communications system (200) of System Embodiment 12, wherein said determining (482) whether or not to include a retry after indicator in the response from the SLB in response to the first SIP invite message is further based (484) on a call type indicator included in the second response message.

System Embodiment 12B. The communications system (200) of System Embodiment 11, wherein said first processor is further configured to: determine (493) a retry after indicator value to be included in a response message from the SLB in response to the first SIP invite message based on the value of the global loss ratio and a call type indicator included in the second response message.

System Embodiment 13. The communications system (200) of System Embodiment 12, wherein said first processor is configured to determine (488) not to include a retry after indicator when the global loss ratio is below a predetermined threshold (e.g., below 0.5), as part of being configured to determine (482) whether or not to include a retry after indicator in the response from the SLB in response to the first SIP invite message based on the value of the global loss ratio.

System Embodiment 14. The communications system (200) of System Embodiment 13, wherein said first processor is further configured to determine (490) to include a retry after indicator when the global loss ratio is equal to or above the predetermined threshold (e.g., below 0.5), as part of being configured to determine (482) whether or not to include a retry after indicator in the response from the SLB in response to the first SIP invite message based on the value of the global loss ratio.

System Embodiment 15. The communications system (200) of System Embodiment 14, wherein said first processor is configured to: determine (490) to include a retry after indicator, as part of being configured to determine (482)

whether or not to include a retry after indicator in the response from the SLB in response to the first SIP invite message based on the value of the global loss ratio; and determine (492) the retry after indicator value (# of second to wait before sending of SIP messages to the first cluster) based on the global loss ratio (e.g., a larger retry indicator value being supplied when the global loss ratio is above a second global loss ratio threshold (0.7) than when below the second threshold and above the first threshold used to trigger inclusion of a retry threshold).

System Embodiment 16. The communications system (200) of System Embodiment 15, wherein said first processor is further configured to: update (416, 468, 469) the global loss ratio based on the loss ratio included in one or more response messages.

System Embodiment 17. The communications system (200) of System Embodiment 16, wherein the communications system (200) includes multiple SLBs (204, 206, 208), e.g., each SLB (204, 206, 208) independently maintaining a GLR (205, 207, 209) without communicating its GLR or total weight to other SLBs sending SIP messages to SBCs in the first cluster.

System Embodiment 18. A communications system (200) comprising: a first Session Initiation Protocol (SIP) load balancer (SLB) (204) including: a first processor (e.g., processor 506 of SLB 204) configured to: operate the first SLB (204) to receive (404), a first SIP INVITE message; select (406), at the first SLB (204), which one of the SIP processing entities (SBC 1 210, SBC 2 212, . . . , SBC 17 214, . . . , SBC 45 216, . . . , SBC 72 218, . . . , SBC n 220) in a first SIP processing entities cluster to send the first SIP invite message based on a message allocation weight (total weight) determined based on message loss information corresponding to different SIP processing entities in the first cluster of SIP processing entities, said selecting including allocating a portion of incoming received SIP invite messages to an individual SIP processing entity based on a message loss rate corresponding to the individual SIP processing entity and said message allocation rate, said selecting including selecting a first SIP processing entity (e.g., SBC 17 214) to receive said first SIP invite message; operate the first SLB (204) to send (408) the first SIP INVITE message to the first SIP processing entity (e.g., SBC 17 214); and operate the first SLB (204) to receive (410) a first SIP response message (e.g., 503 response message or 200 ok responses message) from the first SIP processing entity in response to the first SIP invite message.

System Embodiment 18A. The communications system (200) of System Embodiment 18, wherein the SIP processing entities of the cluster of SIP processing entities are Session Border Controllers.

System Embodiment 18B. The communications system (200) of System Embodiment 18A, wherein the Session Border Controllers are virtual Session Border Controllers executing in a cloud system.

System Embodiment 19. The communications system of system embodiment 1, wherein the SLB receives from the first SBC a first message loss rate value (LR) indicating a message loss rate at the first SBC, said first message loss rate value (LR) being a parameter attached to or included in a message (e.g., SIP message) received from the first SBC.

System Embodiment 20. The communications system of system embodiment 19, wherein when said first SIP response message from the first SBC in response to the first SIP INVITE message is a message rejecting the SIP INVITE message making, at the first SLB, a decision whether or not to send the first SIP invite message to another SBC in the first cluster based on a first global message loss rate value (GLR) maintained at the first SLB and the first message loss rate value received from the first SBC.

System Embodiment 21. The communications system of system embodiment 20, wherein the first SIP response is the message received at the SLB from the first SBC in which the first message loss rate value is included.

System Embodiment 22. The communication system of system embodiment 20, wherein the message including the first message loss rate value is a SIP message dedicated for sending message loss rate information.

System Embodiment 23. The communications system of system embodiment 20, wherein the first SBC is operated to: (i) periodically generate, current message loss rate values, (ii) transmit the periodically generated current message loss rate values to the SLB; and wherein the SLB is operated to: (i) receive the periodically generated current message loss rate values, (ii) update the global message loss rate value, based on the received periodically generated current message loss rate value; and wherein said first message loss rate value is one of said periodically generated current loss rate values.

System Embodiment 24. A communications system comprising: a first Session Initiation Protocol (SIP) load balancer including a processor and memory, said processor controlling the first SLB to: receive, at the first Session Initiation Protocol (SIP) load balancer (SLB), a first SIP INVITE message; select (906), at the first SLB, which Session Border Controller (SBC) in a first cluster of SBCs to send the first SIP invite message based on a message allocation weight (total weight) determined based on resource utilization information corresponding to different SBCs in the first cluster of SBCs, said selecting including allocating a portion of incoming received SIP INVITE messages to an individual SBC based on a resource utilization value corresponding to the individual SBC and said message allocation rate, said selecting including selecting a first SBC from the first cluster of SBCs to send said first SIP INVITE message; sending (908) the first SIP INVITE message to the first SBC; and receiving a first SIP response message (e.g., 503 response or 200 ok response) from the first SBC in response to the first SIP INVITE message.

System Embodiment 25. The communications system of system embodiment 24, wherein the SLB receives from the first SBC a first resource utilization value indicating a first amount of resources being utilized at the first SBC, said first resource utilization value being a parameter attached to or included in a message (e.g., SIP message) received from the first SBC.

System Embodiment 26. The communications system of system embodiment 25, wherein: when said first SIP response message from the first SBC in response to the first SIP INVITE message is a message rejecting the SIP INVITE message making, at the first SLB, a decision whether or not to send the first SIP invite message to another SBC in the first cluster based on a first global resource utilization value (GRU) maintained at the first SLB and the first resource utilization value received from the first SBC.

Numbered List of Exemplary Non-Transitory Computer Readable Medium Embodiments:

Non-transitory Computer Readable Medium Embodiment 1. A non-transitory computer readable medium including a first set of computer executable instructions which when executed by a processor of a first Session Initiation Protocol (SIP) load balancer (SLB) cause the first SLB to: receive (404) a first SIP INVITE message; select (406), at the first SLB, which Session Border Controller (SBC) in a first cluster (230) of SBCs to send the first SIP invite message based on a message allocation weight (total weight) determined based on message loss information corresponding to different SBCs in the first cluster of SBCs, said selecting including allocating a portion of incoming received SIP INVITE messages to an individual SBC based on a message loss rate corresponding to the individual SBC and said message allocation rate, said selecting including selecting a first SBC (e.g., SBC 214) from the first cluster of SBCs to send said first SIP INVITE message; send (408) the first SIP INVITE message to the first SBC; and receive (410) a first SIP response message (e.g., 503 response or 200 ok response) from the first SBC in response to the first SIP INVITE message.

Non-transitory Computer Readable Medium Embodiment 2. The non-transitory computer readable medium embodiment of non-transitory computer readable medium embodiment 1, wherein the first set of computer executable instructions which when executed by a processor of the first Session Initiation Protocol (SIP) load balancer (SLB) further cause the first SLB to: update (412) the message allocation weight (total weight) at the first SLB based on the first SIP response message (sum individual loss rates for SBCs) to generate a new total weight.

While various embodiments have been discussed above and in the claims below, it should be appreciated that not necessarily all embodiments include the same features and some of the features described herein are not necessary but can be desirable in some embodiments. Numerous additional features, embodiments and benefits of various embodiments are discussed in the claims which follow.

The techniques of various embodiments may be implemented using software, hardware and/or a combination of software and hardware. Various embodiments are directed to apparatus, e.g., neural networks, traffic anomaly detection systems/devices, database systems, call processing devices, session border controllers, communications devices, network nodes and/or network equipment devices. Various embodiments are also directed to methods, e.g., method of controlling and/or operating devices such as, neural networks, traffic anomaly detection systems/devices, database systems, call processing devices, session border controllers, communications devices, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border, network nodes and/or network equipment devices, including a processor configured to implement one, multiple or all of the steps of one or more methods of the invention.

In some embodiments, the processor or processors, e.g., CPUs, of one or more devices, e.g., computing nodes such as neural networks, traffic anomaly detection systems/devices, database systems, call processing devices, session border controllers, communications devices, network nodes and/or network equipment devices are configured to perform the steps of the methods described as being performed by the computing nodes, e.g., neural networks, traffic anomaly detection systems/devices, database systems, call processing devices, session border controllers, communications devices, network nodes and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as neural networks, traffic anomaly detection systems/devices, database systems, call processing devices, session border controllers, communications devices, network nodes and/or network equipment devices with a processor which includes a component corresponding to each of the steps of the various described methods performed by the device in which the processor is included. In some but not all embodiments a device, e.g., computing node such as neural networks, traffic anomaly detection systems/devices, database systems, call processing devices, session border controllers, communications devices, network nodes and/or network equipment devices, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a neural network, traffic anomaly detection systems/devices, database systems, call processing devices, session border controllers, communications devices, network nodes and/or network equipment devices described in the present application.

Numerous additional variations on the methods and apparatus of the various embodiments described above will be apparent to those skilled in the art in view of the above description. Numerous additional embodiments, within the scope of the present invention, will be apparent to those of ordinary skill in the art in view of the above description and the claims which follow. Such variations and embodiments are to be considered within the scope of the invention.

What is claimed is:

1. A communications method, the method comprising:
    receiving, at a first Session Initiation Protocol (SIP) load balancer (SLB), a first SIP INVITE message;
    selecting, at the first SLB, which SIP processing entity in a first cluster of SIP processing entities to send the first SIP INVITE message based on a message allocation weight determined based on message loss information corresponding to different SIP processing entities in the first cluster of SIP processing entities, said selecting including allocating a portion of incoming received SIP INVITE messages to an individual SIP processing entity based on a message loss rate corresponding to the individual SIP processing entity and said message allocation weight, said selecting including selecting a first SIP processing entity from the first cluster of SIP processing entities to send said first SIP INVITE message;
    sending the first SIP INVITE message to the first SIP processing entity; and
    receiving a first SIP response message from the first SIP processing entity in response to the first SIP INVITE message.

2. The communications method of claim 1, further comprising:
    updating the message allocation weight at the first SLB based on the first SIP response message to generate a first updated message allocation weight.

3. The communications method of claim 2, further comprising:
    receiving, at the first SLB, a second SIP INVITE message;
    selecting, at the first SLB, which one of the SIP processing entities in the first cluster of SIP processing entities to send the second SIP INVITE message based on the first updated message allocation weight, a second SIP processing entity in said cluster of SIP processing entities being selected to process the second SIP INVITE message.

4. The communications method of claim 3, further comprising:
    receiving, at the first SLB, a second SIP response message including a second message loss rate value indicating a message loss rate at the second SIP processing entity; and
    updating the first updated message allocation weight at the first SLB based on the second SIP response message to generate a second updated message allocation weight.

5. The method of claim 2, further comprising:
    maintaining a first global message loss rate (GLR) value at the first SLB, said maintaining the first global message loss rate value including updating the first GLR value based on a first message loss rate value indicating a message loss rate at the first SIP processing entity.

6. The communications method of claim 2, wherein said updating the message allocation weight at the first SLB based on the first SIP response message to generate a first updated message allocation weight includes generating the first updated message allocation weight based on a total loss weight generated from individual message loss rate values reported by individual SIP processing entities in the first cluster of SIP processing entities.

7. The communications method of claim 6, further comprising:
    determining a portion of incoming SIP INVITE messages received at the first SLB to allocate to one of the individual SIP processing entities of the first cluster of SIP processing entities based on the first updated message allocation weight and the individual loss rate value reported by the one of the individual SIP processing entities.

8. The communications method of claim 1, wherein the first SIP response message is a service unavailable response message that includes a first message loss rate value indicating a message loss rate at the first SIP processing entity, the method further comprising:
    making, at the first SLB, a decision whether or not to send the first SIP INVITE message to another SIP processing entity in the first cluster of SIP processing entities based on a first global message loss rate (GLR) value maintained at the first SLB and the first message loss rate value included in the first SIP response message.

9. The communications method of claim 8,
    wherein said first message loss rate value included in the first SIP response message is greater than the first GLR value; and wherein said decision is a decision to send the first SIP INVITE message to another SIP processing entity in the first cluster of SIP processing entities, the method further comprising:
    sending, from the first SLB, the first SIP INVITE message and the first message loss rate value to a second SIP processing entity in said first cluster of SIP processing entities.

10. The method of claim 9, further comprising:
    receiving a second SIP response message from the second SIP processing entity in response to the first SIP invite message, said second SIP response message being a service unavailable message; and
    maintaining a first global message loss rate (GLR) value at the first SLB, said maintaining the first global message loss rate value including updating the first GLR value based on the first message loss rate corresponding to the first SIP processing entity indicated in said first SIP response message.

11. The communications method of claim 10, further comprising:
receiving, at the first SIP load balancer (SLB), a second SIP INVITE message;
sending the second SIP INVITE message to the second SIP processing entity in the first cluster of SIP processing entities;
receiving from the second SIP processing entity a response to the second SIP INVITE message, said response to the second SIP INVITE message including an additional message loss rate value indicating a message loss rate at the second SIP processing entity; and
wherein maintaining the first global message loss rate (GLR) value at the first SLB includes updating the first GLR value based on the additional message loss rate value indicating a message loss rate at the second SIP processing entity.

12. The communications method of claim 10, wherein the second SIP response message is a service unavailable response message that includes a second message loss rate value indicating a message loss rate at the second SIP processing entity, the method further comprising:
making, at the first SLB, a second decision whether or not to send the first SIP INVITE message to an additional SIP processing entity in the first cluster of SIP processing entities based on the first global message loss rate (GLR) value maintained at the first SLB, the first message loss rate value and the second message loss rate value.

13. The method of claim 12, further comprising:
when the decision at the first SLB is not to send the first SIP INVITE message to an additional SIP processing entity, sending a response from the SLB in response to the first SIP INVITE message indicating service is unavailable.

14. The communications method of claim 13, further comprising:
determining whether or not to include a retry after indicator in the response from the first SLB in response to the first SIP INVITE message based on the value of the first GLR and a call type indicator included in the second response message.

15. The communications method of claim 8,
wherein the first SIP response message is a SIP 503 response message indicating rejection of the first SIP INVITE message, said SIP 503 response message including a call type indicator;
wherein said call type indicated by said call type indicator being determined by said first SIP processing entity; and
wherein said making, at the first SLB, the decision whether or not to send the first SIP INVITE message to another SIP processing entity in the first cluster of SIP processing entities is further based on the call type indicator included in the SIP 503 response message.

16. The communications method of claim 15,
wherein when the call type indicator indicates the call is a non-emergency call, said first SLB makes the determination to not send the first SIP INVITE message to another SIP processing entity in the first cluster of SIP processing entities.

17. The communications method of claim 1,
wherein the first SIP response message is a SIP 503 response message indicating rejection of the first SIP INVITE message, said SIP 503 response message including a call type indicator included in a proprietary parameter of the first SIP response message.

18. The communications method of claim 17, wherein the call type indicator indicates an emergency call, said call type having been determined by the first SIP processing entity.

19. The communications method of claim 17, wherein the first SLB makes a determination as to whether or not to retry sending the first SIP INVITE message to another SIP processing entity of the first cluster of SIP processing entities based on the call type indicator included in the first SIP response message.

20. A communications system comprising:
a first Session Initiation Protocol (SIP) load balancer (SLB) including:
a first processor configured to operate the first SLB to:
receive a first SIP INVITE message;
select, at the first SLB, a SIP processing entity in a first cluster of SIP processing entities to send the first SIP INVITE message based on a message allocation weight determined based on message loss information corresponding to different SIP processing entities in the first cluster of SIP processing entities, said selecting including allocating a portion of incoming received SIP INVITE messages to an individual SIP processing entity based on a message loss rate corresponding to the individual SIP processing entity and said message allocation weight, said selecting including selecting a first SIP processing entity from the first cluster of SIP processing entities to send said first SIP INVITE message;
send the first SIP INVITE message to the first SIP processing entity; and
receive a first SIP response message from the first SIP processing entity in response to the first SIP INVITE message.

21. The communications system of claim 20, wherein said first processor is further configured to operate the first SLB to:
update the message allocation weight at the first SLB based on the first SIP response message to generate a first updated message allocation weight.

22. The communications system of claim 21, wherein said first processor is further configured to operate the first SLB to:
receive a second SIP INVITE message; and
select which one of the SIP processing entities in the first cluster of SIP processing entities to send the second SIP INVITE message based on the first updated message allocation weight, a second SIP processing entity in said cluster of SIP processing entities being selected to process the second SIP INVITE message.

23. The communications system of claim 22, wherein the first processor is further configured to operate the first SLB to:
receive a second SIP response message including a second message loss rate (LR) value indicating a message loss rate at the second SIP processing entity; and
update the first updated message allocation weight at the first SLB based on the second SIP response message to generate a second updated message allocation weight.

24. The communications system of claim 21, wherein said first processor is further configured to operate the first SLB to:
maintain a first global message loss rate (GLR) value at the first SLB, and wherein said to maintain the first global message loss rate value includes updating the first GLR value based on a first message loss rate value indicating a message loss rate at the first SIP processing entity.

25. The communications system of claim 20,
wherein the first SIP response message is a service unavailable response message that includes a first message loss rate value indicating a message loss rate at the first SIP processing entity; and
wherein said first processor is further configured to operate the first SLB to:
make a decision whether or not to send the first SIP INVITE message to another SIP processing entity in the first cluster of SIP processing entities based on a first global message loss rate (GLR) value maintained at the first SLB and the first message loss rate value included in the first SIP response message.

26. The communications system of claim 25,
wherein said first message loss rate value included in the first SIP response message is greater than the first GLR value; and wherein said decision is a decision to send the first SIP INVITE message to another SIP processing entity in the first cluster of SIP processing entities; and
wherein said first processor is further configured to:
operate the first SLB to send, from the first SLB, the first SIP INVITE message and the first message loss rate value to a second SIP processing entity in said first cluster of SIP processing entities.

27. The communications system of claim 26, wherein said first processor is further configured to operate the first SLB to:
receive a second SIP response message from the second SIP processing entity in response to the first SIP INVITE message, said second SIP response message being a service unavailable message; and
maintain a first global message loss rate (GLR) value at the first SLB, and wherein said to maintain the first global message loss rate value includes updating the first GLR value based on the first message loss rate corresponding to the first SIP processing entity indicated in said first SIP response message.

28. A non-transitory computer readable medium including a first set of computer executable instructions which when executed by a processor of a first Session Initiation Protocol (SIP) load balancer (SLB) cause the first SLB to:
receive a first SIP INVITE message;
select, at the first SLB, which SIP processing entity in a first cluster of SIP processing entities to send the first SIP INVITE message based on a message allocation weight determined based on message loss information corresponding to different SIP processing entities in the first cluster of SIP processing entities, said selecting including allocating a portion of incoming received SIP INVITE messages to an individual SIP processing entity based on a message loss rate corresponding to the individual SIP processing entity and said message allocation weight, said selecting including selecting a first SIP processing entity from the first cluster of SIP processing entities to send said first SIP INVITE message;
send the first SIP INVITE message to the first SIP processing entity; and
receive a first SIP response message from the first SIP processing entity in response to the first SIP INVITE message.

* * * * *